US012086373B2

(12) United States Patent
Choi et al.

(10) Patent No.: US 12,086,373 B2
(45) Date of Patent: Sep. 10, 2024

(54) ELECTRONIC DEVICE AND METHOD FOR CONTROLLING DISPLAY OF A PLURALITY OF OBJECTS ON WEARABLE DISPLAY DEVICE

(71) Applicant: Samsung Electronics Co., Ltd., Gyeonggi-do (KR)

(72) Inventors: Inyoung Choi, Gyeonggi-do (KR); Insik Myung, Gyeonggi-do (KR); Seungjoon Lee, Gyeonggi-do (KR); Shinjae Jung, Gyeonggi-do (KR); Hoon Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/507,214

(22) Filed: Oct. 21, 2021

(65) Prior Publication Data
US 2022/0129139 A1    Apr. 28, 2022

Related U.S. Application Data

(63) Continuation of application No. PCT/KR2021/012233, filed on Sep. 8, 2021.

(30) Foreign Application Priority Data

Oct. 22, 2020    (KR) .................. 10-2020-0137830

(51) Int. Cl.
*G06F 3/04815*    (2022.01)
*G02B 27/01*    (2006.01)
(Continued)

(52) U.S. Cl.
CPC ....... *G06F 3/04815* (2013.01); *G02B 27/017* (2013.01); *G06F 3/011* (2013.01);
(Continued)

(58) Field of Classification Search
CPC .. G06F 3/04815; G06F 3/011; G06F 3/04817; G06F 3/0482; G02B 27/017; G02B 2027/0138
(Continued)

(56) References Cited

U.S. PATENT DOCUMENTS 9,690,457 B2    6/2017 Levien et al.
10,134,358 B2   11/2018 Jung et al.
(Continued)

FOREIGN PATENT DOCUMENTS

JP    2017-146651    8/2017
JP    6304305        4/2018
(Continued)

OTHER PUBLICATIONS

IPCOM000238016D, "Technique for dynamically generating and displaying a page summary based on the scrolling speed", published on Jul. 25, 2014. (Year: 2014).*
(Continued)

*Primary Examiner* — Hwei-Min Lu
(74) *Attorney, Agent, or Firm* — The Farrell Law Firm, P.C.

(57)    ABSTRACT

Various embodiments of the disclosure disclose a method and apparatus, where an electronic device may include a communication module, a touch display, a memory, and a processor operatively connected to the communication module and the memory, wherein the processor may be configured to display a plurality of objects on the touch display, receive a touch input for the plurality of objects through the touch display while being connected to a wearable display device through the communication module, identify a direction corresponding to the touch input, identify a display angle and display distance of the wearable display device, determine an arrangement position of the plurality of objects
(Continued)

included in the electronic device based on at least one of the identified direction, the display angle, or the display distance, and control displaying of the plurality of objects on the wearable display device based on the determination result. Various embodiments are possible.

10 Claims, 21 Drawing Sheets

(51) Int. Cl.
    *G06F 3/01*     (2006.01)
    *G06F 3/04817*     (2022.01)
    *G06F 3/0482*     (2013.01)

(52) U.S. Cl.
    CPC ........ *G06F 3/04817* (2013.01); *G06F 3/0482* (2013.01); *G02B 2027/0138* (2013.01)

(58) Field of Classification Search
    USPC ........................................................ 715/848
    See application file for complete search history.

(56) References Cited

U.S. PATENT DOCUMENTS

| | | | |
|---|---|---|---|
| 10,950,205 B2 | 3/2021 | Lee et al. | |
| 2012/0302289 A1* | 11/2012 | Kang | G06F 3/016 |
| | | | 455/557 |
| 2013/0145279 A1* | 6/2013 | Ricci | G08G 1/096725 |
| | | | 715/746 |
| 2014/0078176 A1* | 3/2014 | Kim | G06F 3/011 |
| | | | 345/633 |
| 2014/0282234 A1* | 9/2014 | Ku | H04W 4/60 |
| | | | 715/835 |
| 2015/0067580 A1* | 3/2015 | Um | G06F 3/0481 |
| | | | 715/781 |
| 2016/0026242 A1 | 1/2016 | Burns et al. | |
| 2016/0026253 A1* | 1/2016 | Bradski | H04N 13/128 |
| | | | 345/8 |
| 2016/0370970 A1* | 12/2016 | Chu | G06F 3/011 |
| 2017/0123504 A1* | 5/2017 | Kim | G06F 3/04812 |
| 2017/0185214 A1* | 6/2017 | Kojima | G02B 27/017 |
| 2017/0322622 A1* | 11/2017 | Hong | G06F 3/041 |
| 2017/0337897 A1* | 11/2017 | Jung | G06F 3/012 |
| 2018/0184000 A1* | 6/2018 | Lee | H04N 23/698 |
| 2019/0220002 A1* | 7/2019 | Huang | G06T 7/70 |
| 2019/0339840 A1* | 11/2019 | Park | G10L 15/00 |
| 2020/0005539 A1* | 1/2020 | Hwang | G06F 3/167 |
| 2020/0293178 A1 | 9/2020 | Kumar et al. | |

FOREIGN PATENT DOCUMENTS

| | | |
|---|---|---|
| KR | 10-1252169 | 4/2013 |
| KR | 1020150026336 | 3/2015 |
| KR | 1020170089662 | 8/2017 |
| KR | 1020170129509 | 11/2017 |
| KR | 1020190134975 | 12/2019 |
| KR | 1020200061930 | 6/2020 |

OTHER PUBLICATIONS

International Search Report dated Dec. 2, 2021 issued in counterpart application No. PCT/KR2021/012233, 16 pages.

* cited by examiner

FIG. 5A
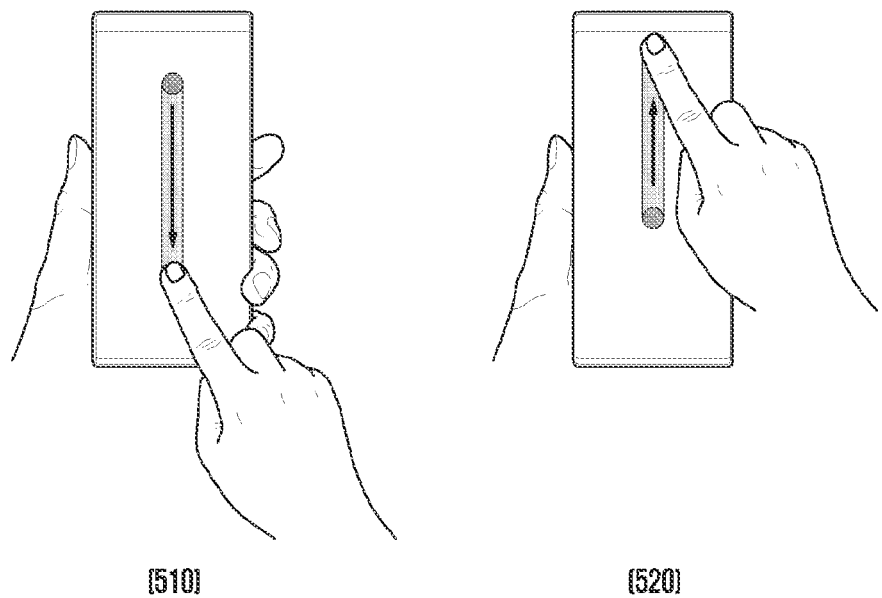
[510]  [520]
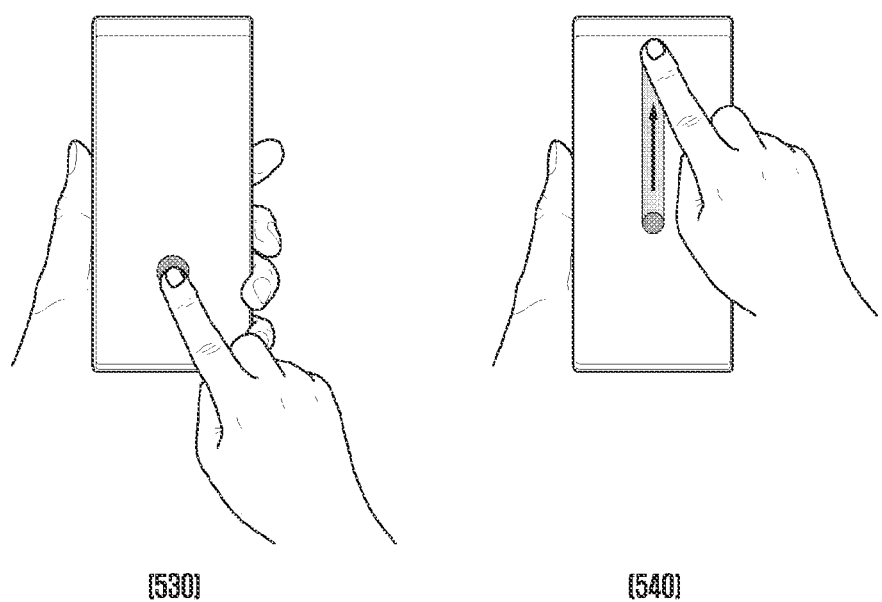
[530]  [540]

FIG. 5B
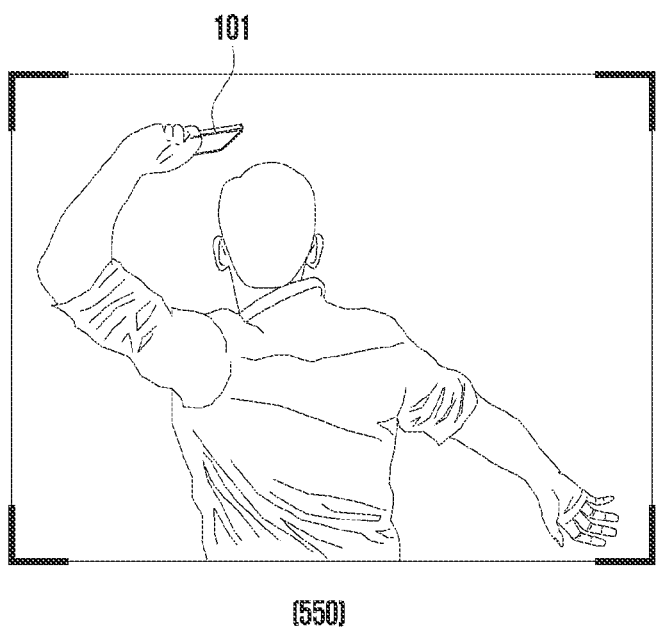
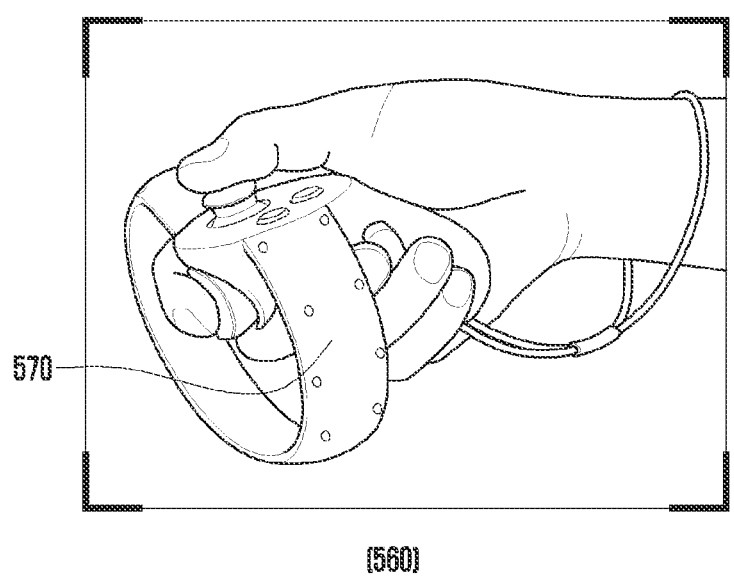

FIG. 6
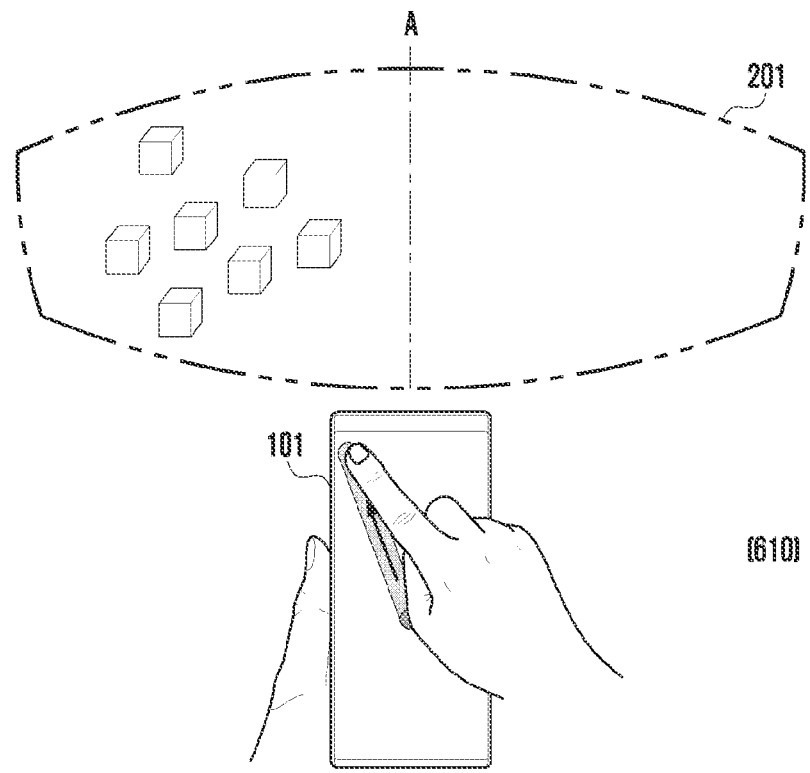
(610)
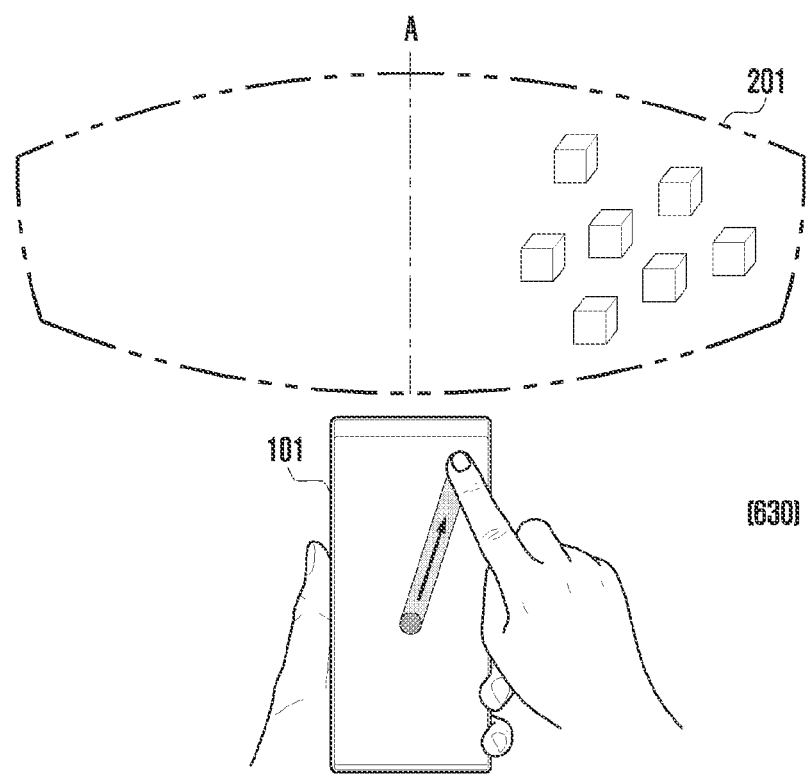
(630)

FIG. 8B
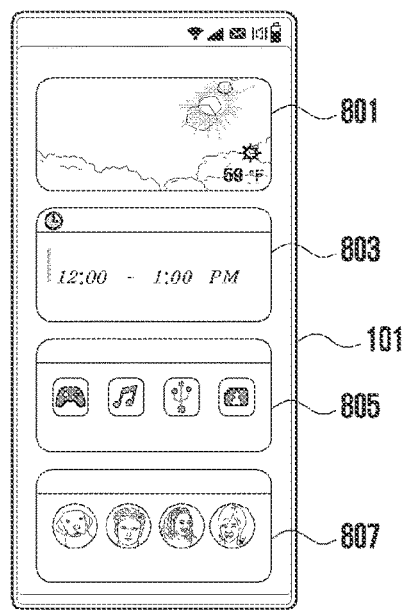
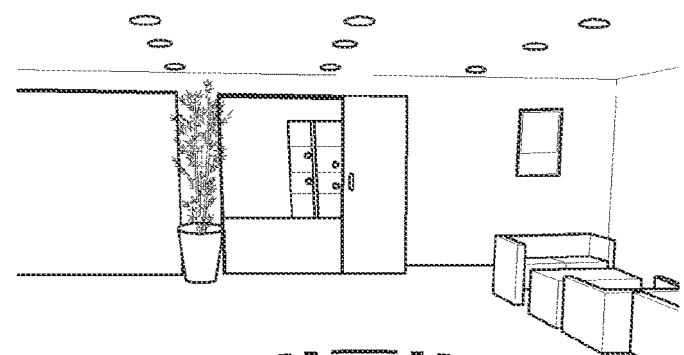
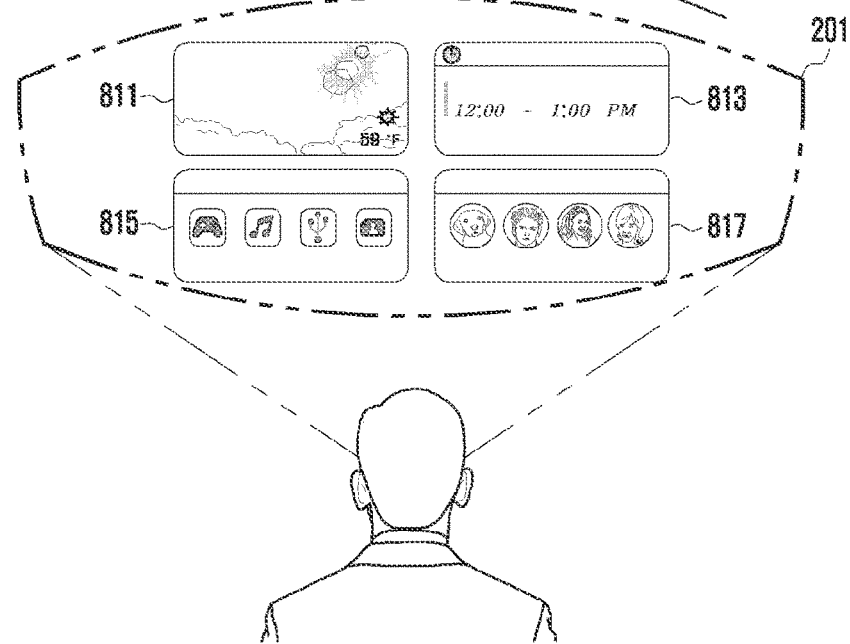

FIG. 8F
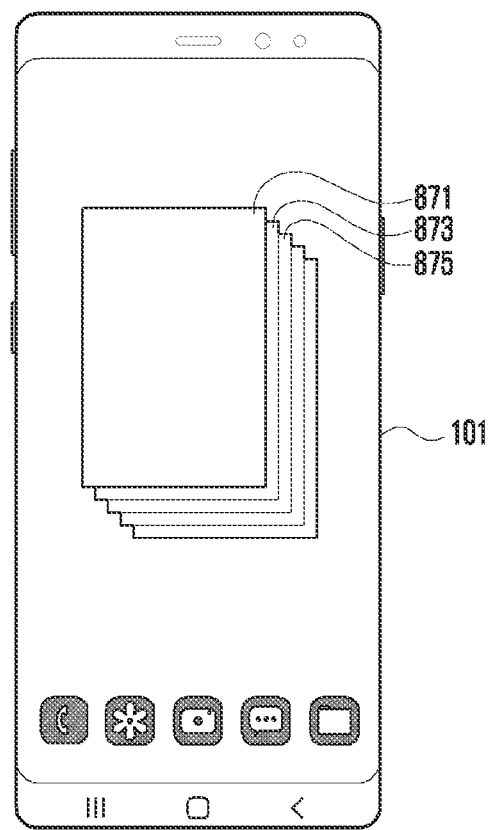
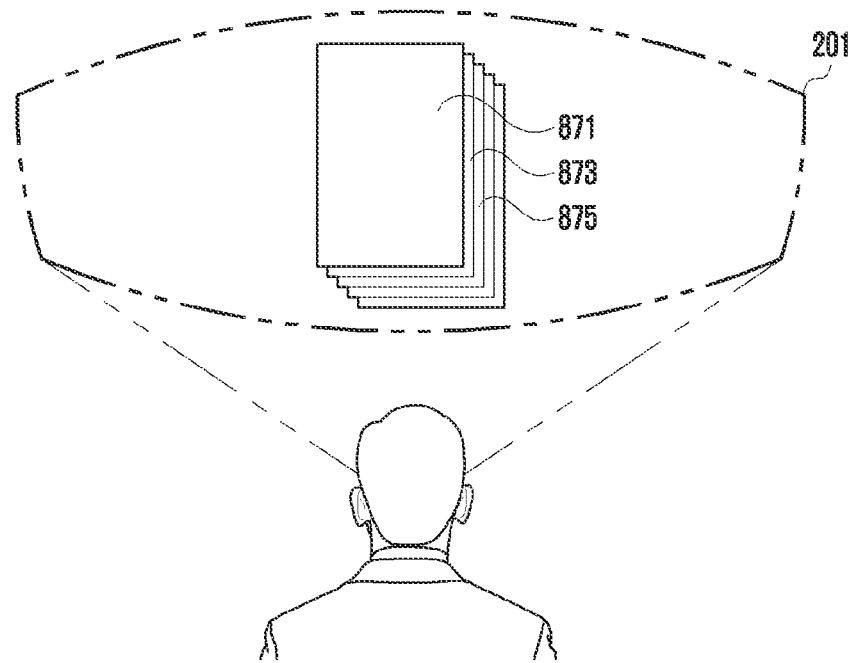

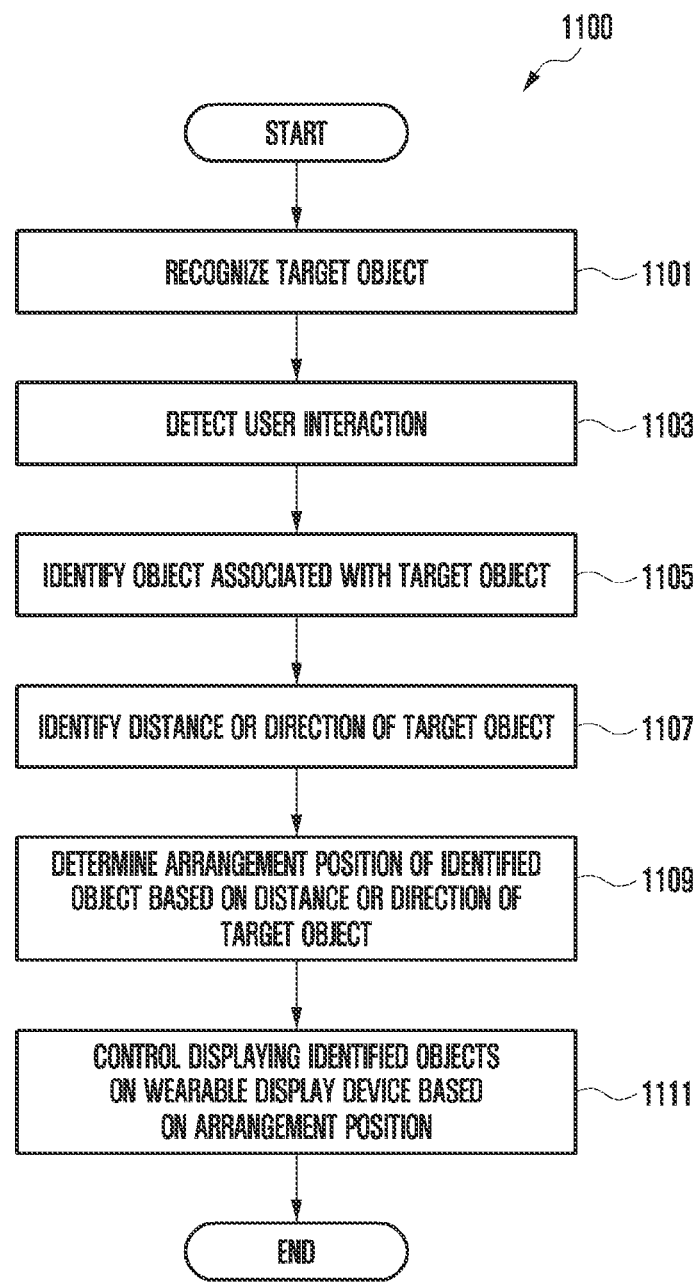

ELECTRONIC DEVICE AND METHOD FOR CONTROLLING DISPLAY OF A PLURALITY OF OBJECTS ON WEARABLE DISPLAY DEVICE

CROSS-REFERENCE TO RELATED APPLICATION(S)

This application is a Bypass Continuation Application of International Application No. PCT/KR2021/012233, which was filed on Sep. 8, 2021, and is based on and claims priority under 35 U.S.C. § 119 to Korean Patent Application No. 10-2020-0137830, which was filed in the Korean Intellectual Property Office on Oct. 22, 2020, the entire disclosure of each of which is incorporated herein by reference.

BACKGROUND

1. Field

Various embodiments of the disclosure disclose a method and apparatus for controlling display of plural objects included in an electronic device on a wearable display device such as augmented reality (AR) or virtual reality (VR) glasses.

2. Description of Related Art

In recent years, research and development have been conducted on extended reality (XR) technology such as virtual reality (VR), augmented reality (AR) and/or mixed reality (MR). Recently, VR, AR and/or MR technologies are being used in various fields (e.g., entertainment, infotainment, smart home, and/or smart factory), and continuous research and development are being conducted on the hardware part and/or the software part of electronic devices correspondingly.

For example, wearable display devices (e.g., AR glasses or smart glasses), head mounted devices (e.g., head mounted display (HMD)), or smartphones, alone or in cooperation with two or more devices, may layer (or, overlay) various digital content (e.g., virtual images) on top of the real world through an application related to an AR service and provide it as a single image through the display.

SUMMARY

Various embodiments may disclose a method and apparatus that can, in a state where an electronic device and a wearable display device (e.g., AR glasses) are connected, perform controlling so that a plurality of objects (e.g., application icons, images) displayed on the electronic device are displayed at once in a spread-out form on the wearable display device according to a configured user interaction.

An electronic device according to various embodiments may include: a communication module; a touch display; a memory; and a processor operatively connected to the communication module and the memory, wherein the processor may be configured to: display a plurality of objects on the touch display; receive a touch input for the plurality of objects through the touch display in a state of being connected to a wearable display device through the communication module; identify a direction corresponding to the touch input; identify a display angle and display distance of the wearable display device; determine an arrangement position of the plurality of objects included in the electronic device based on at least one of the identified direction, display angle, or display distance; and control displaying the plurality of objects on the wearable display device based on the determination result.

An operation method of an electronic device according to various embodiments may include: displaying a plurality of objects on a touch display of the electronic device; receiving a touch input for the plurality of objects through the touch display in a state of being connected to a wearable display device through a communication module of the electronic device; identifying a direction corresponding to the touch input; identifying a display angle and display distance of the wearable display device; determining an arrangement position of the plurality of objects included in the electronic device based on at least one of the identified direction, display angle, or display distance; and controlling displaying the plurality of objects on the wearable display device based on the determination result.

According to various embodiments, user convenience may be improved by controlling a plurality of objects displayed on the electronic device to be displayed on the wearable display device at once in a spread-out form.

According to various embodiments, the arrangement position of plural objects to be displayed on the wearable display device is determined based on at least one of the direction of the electronic device, the direction of a user interaction, the display angle of the wearable display device, or the display distance thereof, so that a plurality of objects may be automatically displayed in the visual field of the user wearing the wearable display device.

According to various embodiments, the arrangement position of an object in a virtual space shown to the user through the wearable display device is determined differently according to the attribute of the object to be displayed on the wearable display device, so that visibility can be improved.

BRIEF DESCRIPTION OF DRAWINGS

The above and other aspects, features, and advantages of certain embodiments of the disclosure will be more apparent from the following description taken in conjunction with the accompanying drawings, in which:

FIGS. 5A and 5B are diagrams illustrating examples of a user interaction according to various embodiments;

FIG. 6 is a diagram illustrating an example of the arrangement direction of plural objects in response to the direction of a user interaction according to various embodiments;

FIGS. 8A to 8F are diagrams illustrating examples of displaying a plurality of objects on the wearable display device according to various embodiments;

FIG. 11 is a flowchart illustrating a method for the electronic device to recognize a target object and display a plurality of objects according to various embodiments.

DETAILED DESCRIPTION

Figure 1:
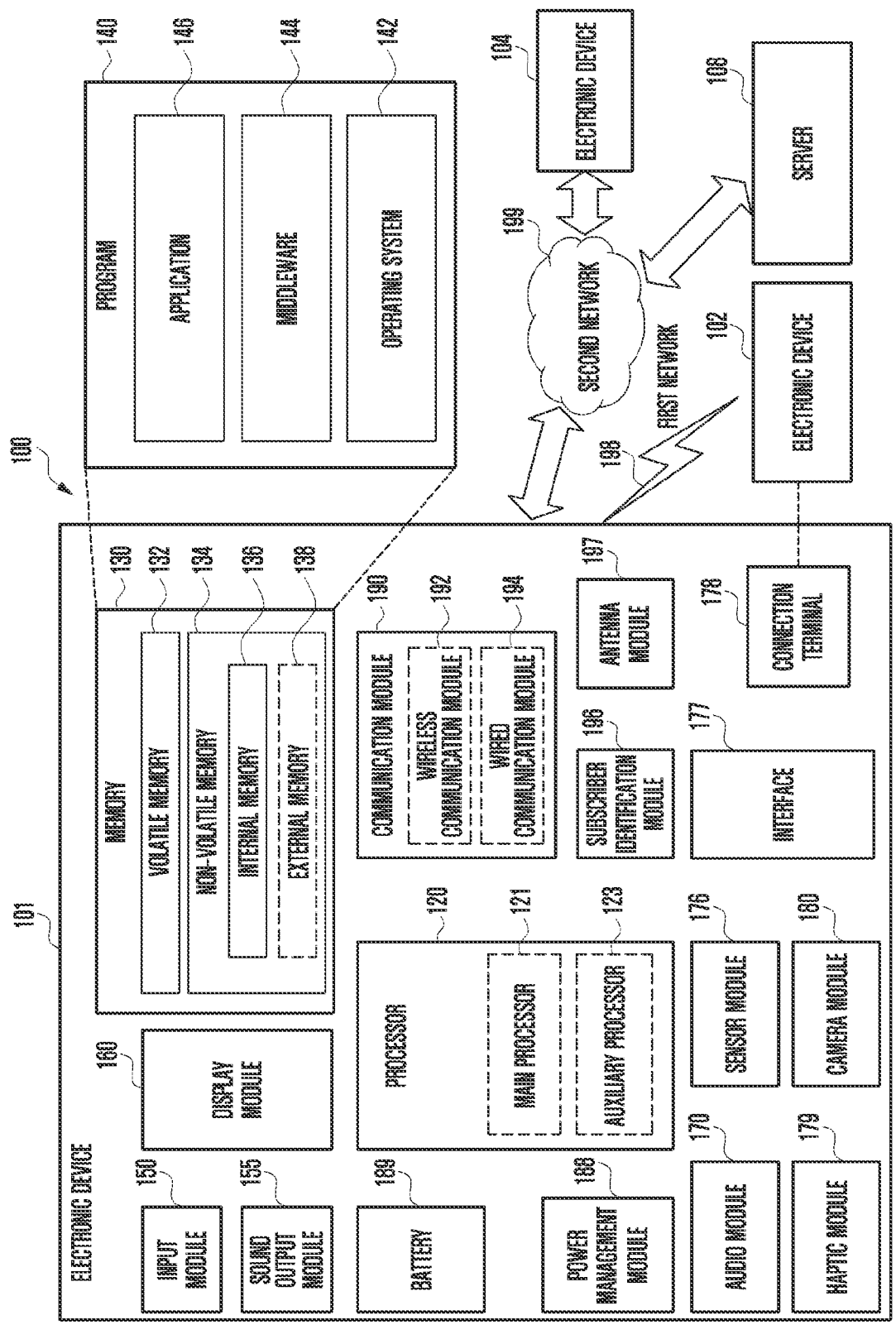
FIG. 1 is a block diagram of an electronic device in a network environment according to various embodiments.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR)

access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
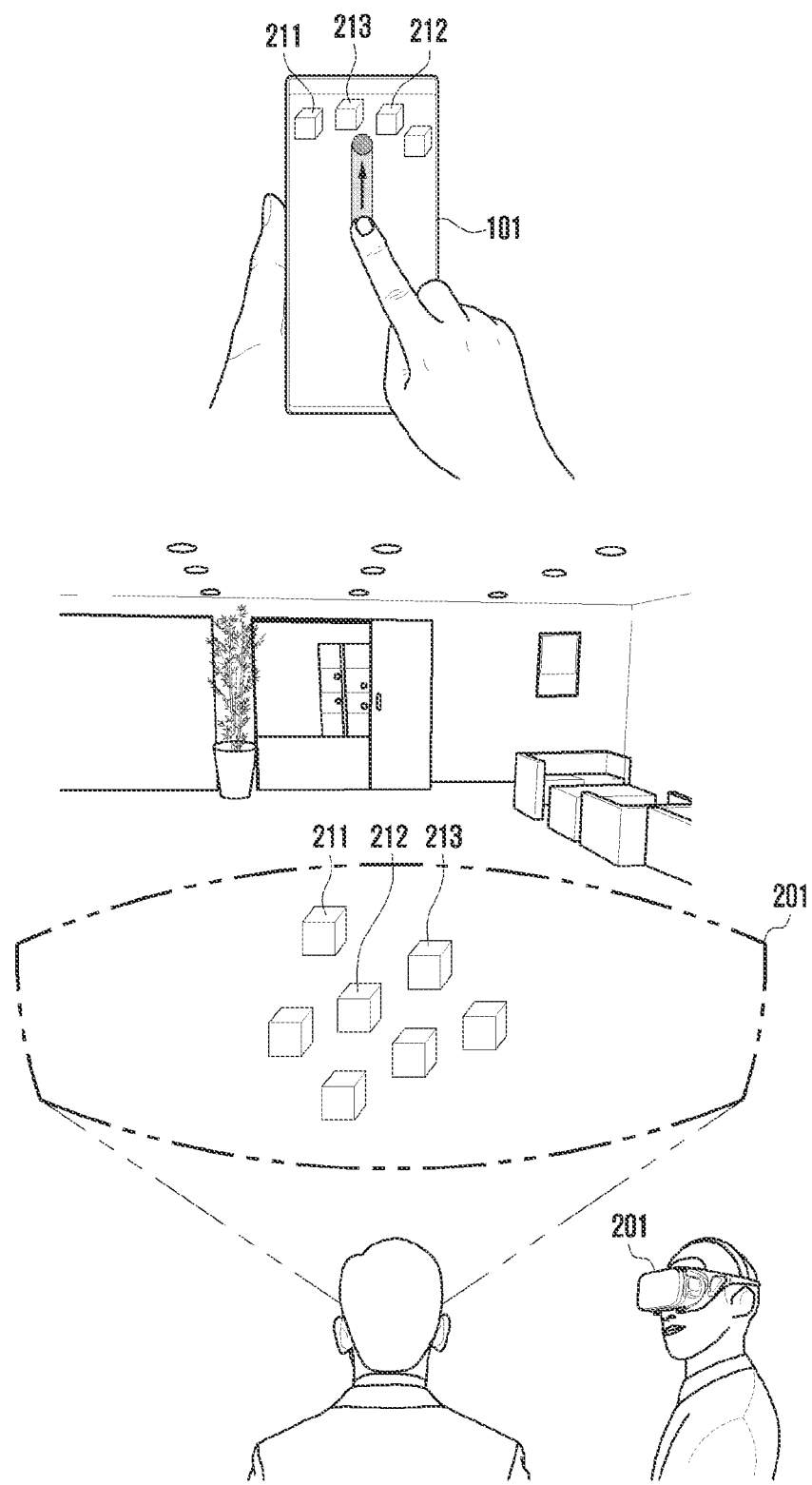
FIG. 2 is a diagram showing an example of displaying a plurality of objects on a wearable display device in response to a user interaction on the electronic device according to various embodiments.

FIG. 2 is a diagram showing an example of displaying a plurality of objects on a wearable display device in response to a user interaction on the electronic device according to various embodiments.

Referring to FIG. 2, the electronic device (e.g., electronic device 101 in FIG. 1) according to various embodiments may be connected to the wearable display device 201. The electronic device 101 and the wearable display device 201 may be wiredly connected or wirelessly paired. As the pairing method between two devices corresponds to the related art, a detailed description thereof may be omitted. According to various embodiments, the electronic device 101 may include a smartphone, a tablet personal computer (PC), and/or a notebook computer. The wearable display device 201 may include AR glasses, smart glasses, or a head mounted device (e.g., head mounted display (HMD)).

For an AR or VR service, the wearable display device 201 may directly generate related data (e.g., AR images) (e.g., generation based on stored or processed data) or may obtain related data from the outside (e.g., electronic device 101 or server (e.g., server 108 in FIG. 1) and display it through the display (not shown). For example, the wearable display device 201 may be worn on the user's body (e.g., face) and may overlay various digital content (e.g., AR images) on the real world and display it as a single image (e.g., AR screen) through the display. According to an embodiment, the wearable display device 201 may receive image data (e.g., AR image) from the electronic device 101 and display the received image data together with real-world data through the display.

According to an embodiment, when being connected to the electronic device 101 for communication, the wearable display device 201 may transmit image information (or, data) captured through a camera thereof (not shown) to the electronic device 101 on a periodic basis and/or when a state change (e.g., change in position or direction) occurs in the wearable display device 201. According to an embodiment, when the wearable display device 201 is connected to the electronic device 101, the wearable display device 201 may provide (e.g., transmit) at least one information such as image information, device information, sensing information, function information, and/or location information to the electronic device 101.

According to an embodiment, based on the image information, device information, sensing information, function information, and/or location information received from the wearable display device 201, the electronic device 101 or the server 108 may generate data related to the image information (e.g., AR image) and transmit it to the wearable display device 201.

In a state where the electronic device 101 and the wearable display device 201 are connected, the electronic device 101 may detect a user interaction. The user interaction may include at least one of a touch input through a touch display (e.g., display module 160 in FIG. 1) of the electronic device 101, a motion change of the electronic device 101, or a motion change of a controller connected to the electronic device 101. For example, the touch input may be indicative of touching the display module 160, dragging downward (e.g., a scroll down), and then dragging upward (e.g., a scroll up), or may be indicative of touching the display module 160, holding for a certain period of time, and then dragging upward. The motion change of the electronic device 101 may include a user action of gripping and swinging the electronic device 101. Or, the motion change of the controller (e.g., mobile controller) may include a user action of pressing a specific button of the controller and swinging the controller. The user interaction may mean an input (e.g., configured input) for displaying a plurality of objects displayed on the electronic device 101 on the wearable display device 201. The user interaction may be pre-configured in the electronic device 101 or may be configured by the user.

According to various embodiments, when the user interaction is a configured input (e.g., for displaying a plurality of objects on the wearable display device 201), the electronic device 101 may control displaying the plurality of objects 211, 212, and 213 that are being displayed on the electronic device 101, on the wearable display device 201. For example, the objects may include an application icon displayed on the home screen of the electronic device 101, widget information, and plural items included in the screens of a plurality of applications or an execution screen of an application. For example, an item may include a contact, an alarm, a photograph, or a document. The items may also refer to a list of plural contacts, a list of plural alarms, a plurality of photographs, or a document composed of multiple pages. Upon detection of the user interaction, the electronic device 101 may control displaying a plurality of objects that are displayed on the electronic device 101 at once on the wearable display device 201 according to the user interaction.

According to various embodiments, the electronic device 101 may determine an arrangement position for displaying the plurality of objects on the wearable display device 201 based on at least one of the direction of the electronic device 101, the direction of the user interaction, the display angle (or display range) of the wearable display device 201, or the display distance (or display location) of the wearable display device 201. For example, the electronic device 101 may sense the direction (or state) of the electronic device 101 by using a geomagnetic sensor or a motion sensor (e.g., sensor module 176 in FIG. 1). The direction of the electronic device 101 may be divided into a horizontal direction and a vertical direction, and may be divided into more directions (e.g., vertical direction or horizontal direction skewed to the top, bottom, left or right). The electronic device 101 may sense the direction of the user interaction from the change of position (or trajectory) where the user touches and drags the display module 160. Or, the electronic device 101 may analyze the image received from the wearable display device 201 and sense the direction of the user interaction from the movement direction of the user's hand included in the image. Or, the processor 120 may use the sensor module 176 to detect the swinging direction of the electronic device 101 or the swinging direction of the controller as the direction of a user interaction. The direction of the user interaction may include at least one of an upward direction, a downward direction, a left direction, a right direction, or a diagonal direction (e.g., moving from the center to the upper left or upper right).

According to various embodiments, the electronic device 101 may obtain (or identify) the display angle or display distance of the wearable display device 201. The display angle (or, display range) may mean the viewing angle (e.g., field of view (FOV) or angle of view (AOV)).

The range of displaying the real world (or virtual space) shown to the user through the wearable display device 201 may vary according to the display angle. The display distance (or, display location) may mean the distance away from the user, and may include at least one of, for example, a first display distance (e.g., display lock) at which the object is displayed on the glasses (e.g., glasses 310 in FIG. 3), a second display distance (e.g., body lock) separated by a first preset distance from the first display distance (e.g., the upper body of the user), or a third display distance (e.g., a world lock) separated by a second preset distance from the second display distance (e.g., an object in the space where the user is located (e.g., wall, furniture)).

For example, the display lock may indicate that the location of the object displayed on the glasses 310 is fixed with respect to the location of the electronic device 101. The body lock may indicate that the location of the object is fixed with respect to the user wearing the glasses 310. The world lock may indicate that the location of an object is fixed with respect to an absolute location. The electronic device 101 may fix the location at which an object is displayed to one of the display lock, the body lock, and the world lock according to a user input. The first display distance may correspond to a distance closest to the user wearing the wearable display device 201, and the third display distance may correspond to a distance farthest from the user. Hereinafter, the display distances classified into three types will be described for illustration, but the display distances may be more or less than three.

The electronic device 101 may determine the location (or distance) at which the plurality of objects are disposed on the display distance based on the speed of the user interaction. When the electronic device 101 is connected to the wearable display device 201, it may receive at least one of image information, sensing information, or location information periodically or selectively from the wearable display device 201. The electronic device 101 may calculate the display angle or display distance of the wearable display device 201 by using the received information. Or, the electronic device 101 may receive the display angle or display distance from the wearable display device 201.

For example, when the direction of the user interaction is a right diagonal direction, the electronic device 101 may determine the arrangement direction (or position) so that the plurality of objects are displayed in a right direction on the display angle of the wearable display device 201. Or, when the direction of the user interaction is a left diagonal direction, the electronic device 101 may determine the arrangement position so that the plurality of objects are displayed in a left direction on the display angle of the wearable display device 201. Alternatively, the electronic device 101 may determine the location (or distance) at which the plurality of objects are disposed on the display angle, or the number (or amount) of objects based on the speed of the user interaction. For example, when the user interaction is detected at a first speed, the electronic device 101 may control disposing the plurality of objects at the first display distance. When the user interaction is detected at a second speed, the electronic device 101 may control disposing the plurality of objects at the second display distance. The first speed may be faster than the second speed, and the first display distance may be farther than the second display distance. Or, the reverse is also possible.

According to various embodiments, the electronic device 101 may determine the number (or amount) of objects displayed on the display angle based on the speed of the user interaction. For example, the electronic device 101 may control disposing a first set number of objects at the first display distance when the user interaction is detected at a first speed, and may control disposing a second set number of objects at the second display distance when the user interaction is detected at a second speed. When the first speed is faster than the second speed, the first set number may be greater than the second set number. Or, the reverse is also possible.

According to various embodiments, the electronic device 101 may determine the arrangement position of an object according to the attribute of the object. The attribute of an object may include at least one of time, history (or frequency), file, and application. For example, according to the time attribute of objects (e.g., creation time (e.g., creation time of a photograph or document), recently used time of an object (e.g., recently used time of an application)), the electronic device 101 may control arranging plural objects in newest to oldest order in a horizontal direction (e.g., from left to right of the wearable display device 201) of the display distance of the wearable display device 201. For example, or, the electronic device 101 may control arranging plural objects used during one recent day (e.g., recent past) when the user interaction is at a first speed (e.g., slow speed), and may control arranging plural objects used for one week (e.g., distant past) when the user interaction is at a second speed (e.g., fast speed). Or, the reverse is also possible.

Or, according to the usage history attribute of objects, the electronic device 101 may control arranging plural objects in order of usage frequency from high to low at different positions (e.g., from front (e.g., near side) to back (e.g., far side)) in the depth direction of the display distance of the wearable display device 201. Or, according to the file attribute (e.g., size or volume) of objects, the electronic device 101 may control arranging plural objects in an order of size, from largest to smallest, at different positions (e.g., from front to back) in the depth direction of the display distance of the wearable display device 201.

According to the application attribute of objects, the electronic device 101 may control arranging plural objects on the side surface, the front surface, or the bottom surface on the display angle of the wearable display apparatus 201. For objects corresponding to a first application attribute (e.g., a main characteristic of being attached to a wall, such as a clock, timer, or calendar), the electronic device 101 may control disposing the corresponding objects on the side surface (e.g., left and right sides) or the front surface on the display angle of the wearable display device 201. For objects corresponding to a second application attribute (e.g., a main characteristic of being placed on a flat surface, such as paper and a notebook), the electronic device 101 may control disposing the corresponding objects on the bottom surface on the display angle of the wearable display device 201. For objects corresponding to a third application attribute (e.g., image, moving image), the electronic device 101 may control disposing the corresponding objects on the front surface on the display angle of the wearable display device 201.

According to various embodiments, the electronic device 101 may recognize a target object and control disposing plural objects on the wearable display device 201 based on the location of the target object. For example, the wearable display device 201 may obtain an image through the camera and transmit the obtained image to the electronic device 101 in real time. When a target object is recognized from the obtained image, the electronic device 101 may identify a plurality of objects associated with the recognized target object. The target object may include an Internet-of-Things (IoT) device such as a car or a refrigerator, or a person. When the target object is a car, the object associated with the target object may mean an application related to the car (e.g., navigation application, smart key). Alternatively, the electronic device 101 may recognize a face from the obtained image and identify a plurality of objects associated with the recognized face. The object related to the face may mean a photograph, a contact, and a schedule corresponding to the recognized face.

Figure 3:
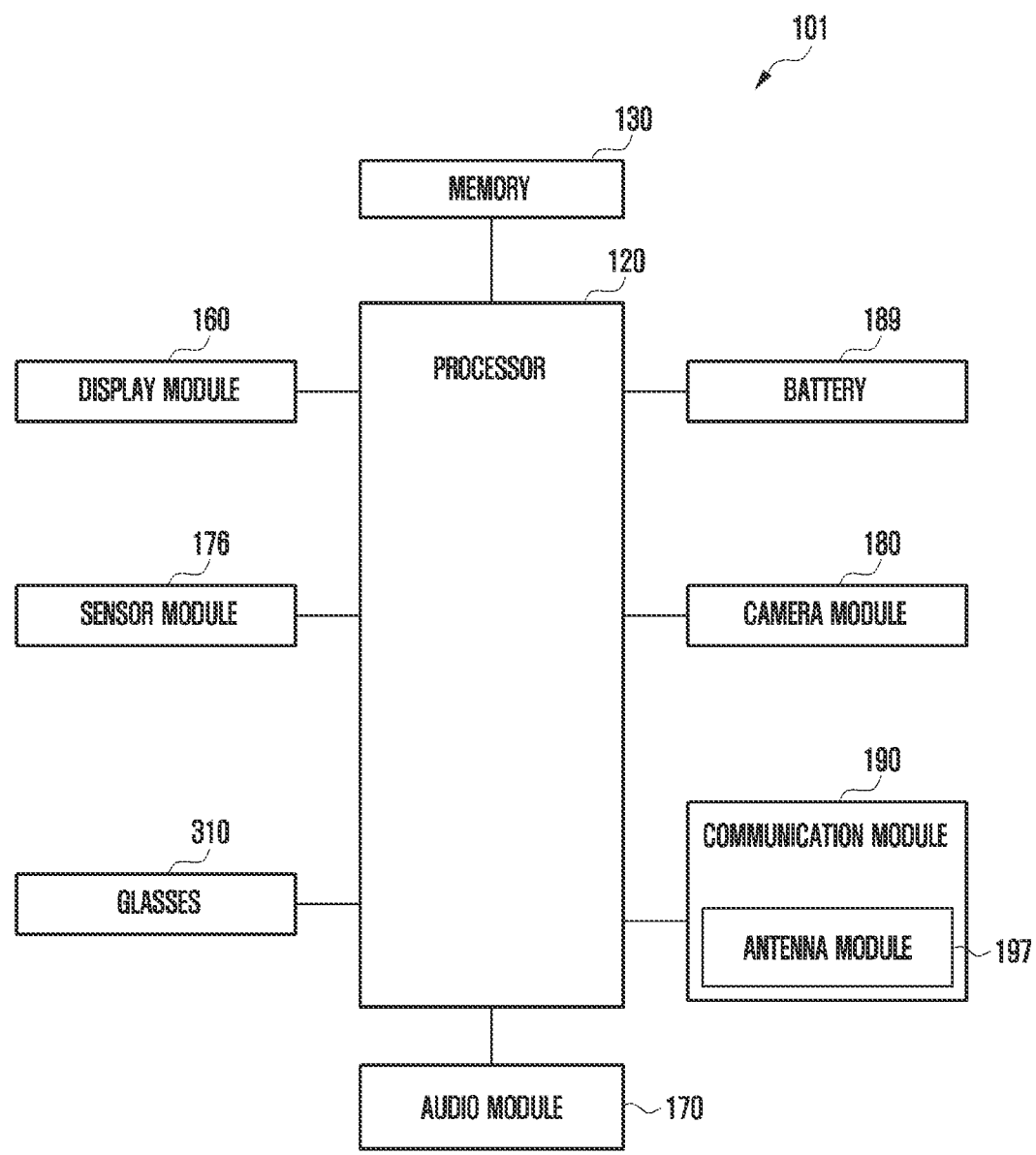
FIG. 3 is a diagram schematically illustrating a configuration of the electronic device according to various embodiments.

FIG. 3 is a diagram schematically illustrating a configuration of the electronic device according to various embodiments.

An example of a configuration related to supporting an AR or VR service in the electronic device (e.g., electronic device 101 in FIG. 1) according to various embodiments may be shown. According to an embodiment, the electronic device 101 shown in FIG. 3 may include all or at least some of the components of the electronic device 101 described with reference to FIG. 1. According to an embodiment, FIG. 3 may illustrate a case in which the electronic device 101 is a wearable display device 201.

Referring to FIG. 3, the electronic device 101 may include a processor 120, a display module 160, a sensor module 176, glasses 310, a battery 189, a camera module 180, a communication module 190, a memory 130, and an audio module 170.

According to an embodiment, the components included in the electronic device 101 may be understood as, for example, a hardware module (e.g., circuitry). According to an embodiment, components included in the electronic device 101 may be not limited to those shown in FIG. 3 (e.g., display module 160, sensor module 176, glasses 310, battery 189, camera module 180, and/or communication module 190). For example, components of the electronic device 101 shown in FIG. 3 may be omitted or replaced with other components, or additional components may be added. For example, the glasses 310 may be included when the electronic device 101 is a wearable display device 201, and may be not included when the electronic device 101 is a smartphone.

According to an embodiment, the glasses 310 may include a condensing lens and/or a transparent waveguide. For example, the transparent waveguide may be positioned at least in part at a portion of the glasses 310. According to an embodiment, the light emitted from the display module 160 may be incident on one end of the glasses 310, and the incident light may be delivered to the user through a waveguide formed in the glasses 310. The waveguide may be made of glass or polymer, and may include a nano-pattern formed on an inner or outer surface, for example, a polygonal or curved grating structure. According to an embodiment, the incident light may be propagated or reflected inside the waveguide and delivered to the user.

According to an embodiment, the display module 160 may include a plurality of panels (or, display areas), and the plural panels may be placed in the glasses 310. According to an embodiment, at least a portion of the display module 160 may be formed of a transparent element, and the user can perceive the actual space behind the display module 160 through the display module 160. According to an embodiment, the display module 160 may display an object as a virtual object in at least some of the transparent element so that the user sees the object as being added to at least a portion of the real world or virtual space. According to an embodiment, when the display module 160 is a transparent uLED, the waveguide configuration in the glasses 310 may be omitted.

According to an embodiment, the sensor module 176 may include a proximity sensor, an illuminance sensor, and/or a gyro sensor. According to an embodiment, the proximity sensor may detect an object in proximity to the electronic device 101. According to an embodiment, the illuminance sensor may measure the level of brightness around the electronic device 101. According to an embodiment, the processor 120 may identify the brightness level around the electronic device 101 by using the illuminance sensor, and change brightness related configuration information of the display module 160 based on the brightness level. For example, when the surrounding brightness is brighter than the preset brightness, the processor 120 may set the brightness level of the display module 160 to be higher so as to increase the user's visibility. According to an embodiment, the gyro sensor may detect the posture and position of the electronic device 101. For example, the gyro sensor may detect whether the electronic device 101 is properly worn on the user's head. As another example, the gyro sensor may detect the movement of the electronic device 101 or the user wearing the electronic device 101.

According to an embodiment, the communication module 190 may include an antenna module 197. For example, the communication module 190 may support various techniques (e.g., beamforming, multiple input and output (MIMO), and/or array antenna) to secure performance in a specified frequency band. According to an embodiment, the antenna module 197 may transmit or receive a signal or power to or from the outside (e.g., wearable display device 201). According to an embodiment, the antenna module 197 may include a plurality of antennas (e.g., array antenna). According to an embodiment, a signal or power may be transmitted or received between the communication module 190 and the wearable display device 201 through the antenna module 197.

According to an embodiment, the memory 130 may correspond to the memory 130 described in the description with reference to FIG. 1. According to an embodiment, when the electronic device 101 provides an AR service, the memory 130 may store various data used by the electronic device 101. The data may include, for example, software (e.g., programs 140), and input data or output data for commands associated therewith.

According to an embodiment, the audio module 170 may convert a sound into an electric signal, or, conversely, convert an electric signal into a sound, based on the control of the processor 120.

According to an embodiment, the processor 120 may correspond to the processor 120 described in the description with reference to FIG. 1. According to an embodiment, the processor 120 may execute, for example, an application (e.g., AR application) to control the wearable display device 201 connected to the electronic device 101 in AR, and may perform various data processing or operations related to an AR service. According to an embodiment, as at least part of data processing or operations, the processor 120 may store data received through the communication module 190 in the memory 130, process data stored in the memory 130, and store the result data in the memory 130 and/or transmit it to the wearable display device 201.

According to an embodiment, the processor 120 may control the display module 160 to display a single image (e.g., AR screen) by overlaying various digital content (e.g., AR image) on the provided real world. According to an embodiment, the processor 120 may estimate first information (e.g., distance and direction) between a target object (e.g., car, refrigerator, person) and the electronic device 101 on the AR screen. According to an embodiment, the electronic device 101 may include various sensors (e.g., sensor module 176, camera module 180), and the processor 120 may measure the distance and direction to the target object based on sensing information using at least one sensor. According to an embodiment, the electronic device 101 may include at least one sensor such as an infrared sensor, a time-of-flight (ToF) sensor (or ToF camera), an AR camera, and/or a next-generation AR camera (e.g., lidar sensor), and the processor 120 may use a corresponding sensor to emit a specified signal (e.g., infrared ray, light source, laser) toward a subject (e.g., target object) and measure the time for the output signal to be reflected by the subject and to return, to thereby estimate the distance and direction to the image (e.g., target object) provided through the AR screen.

An electronic device (e.g., electronic device 101 in FIG. 1) according to various embodiments may include a communication module (e.g., communication module 190 in FIG. 1), a touch display (e.g., display module 160 in FIG. 1), a memory (e.g., memory 130 in FIG. 1), and a processor (e.g., processor 120 in FIG. 1) operatively connected to the communication module and the memory, wherein the processor may be configured to display a plurality of objects on the touch display, receive a touch input for the plurality of objects through the touch display in a state of being connected to a wearable display device through the communication module, identify the direction corresponding to the touch input, identify the display angle and display distance of the wearable display device, determine the arrangement position of the plurality of objects included in the electronic device based on at least one of the identified direction, display angle, or display distance, and control displaying the plurality of objects on the wearable display device based on the determination result.

The electronic device may further include a sensor module (e.g., sensor module 176 in FIG. 1), and the processor may be configured to detect, as a user interaction, at least one of a preset touch input detected on the touch display, a motion change of the electronic device detected through the sensor module, or a motion change of a controller connected to the electronic device.

The processor may be configured to obtain the direction of the electronic device or the direction of the user interaction in a direction corresponding to the touch input.

The processor may control arranging an object displayed on the touch display or an object related to the touch input in a space displayed on the wearable display device.

The processor may be configured to receive at least one of image information, sensing information, or location information from the wearable display device, and calculate the display angle or display distance of the wearable display device by using the received information.

The processor may be configured to determine the position at which the plurality of objects are to be arranged or the number of plurality of objects to be arranged, at the display distance based on the speed of the user interaction.

The processor may be configured to determine the number of the plurality of objects based on the time of the user interaction.

The processor may identify the attribute of an object included in the plurality of objects, and determine the arrangement position of plurality of objects displayed on the electronic device based on at least one of the identified direction, display angle, display distance, or object attribute, wherein the object attribute may include at least one of time, history, file, or application.

The processor may control arranging the plurality of objects at positions in one direction within the display distance of the wearable display device according to the time attribute of the plurality of objects.

The processor may be configured to control arranging the plurality of objects at different positions in the depth direction of the display distance of the wearable display device according to the history attribute or file attribute of the plurality of objects, or may be configured to arrange the plurality of objects at different positions in at least one of a horizontal direction, a vertical direction, or a depth direction on the display angle of the wearable display device according to the application attribute of the plurality of objects.

The display distance may include a first display distance where the positions of the plurality of objects are fixed with respect to the position of the electronic device, a second display distance where the positions of the plurality of objects are fixed with respect to the user wearing the wearable display device, and a third display distance where the positions of the plurality of objects are fixed with respect to an absolute location, and the processor may be configured to fix the positions where the plurality of objects are displayed at one of the first display distance, the second display distance, and the third display distance according to the touch input.

The processor may transmit arrangement information including the determined arrangement position and object information corresponding to the plurality of objects to the wearable display device, and control the wearable display device to display a plurality of objects at corresponding positions based on the arrangement information and the object information.

The processor may be configured to obtain an image captured by a camera of the wearable display device from the wearable display device, recognize a target object by analyzing the obtained image, identify an object associated with the target object based on the user interaction, identify the distance or direction of the target object, and determine the arrangement position of the identified object based on the distance or direction of the target object.

The processor may be configured to identify the attribute of the identified object or the level of association between the target object and the identified object, and apply a different location adjacent to the target object or a different size to the identified object according to the attribute of the identified object or the level of association.

Figure 4:
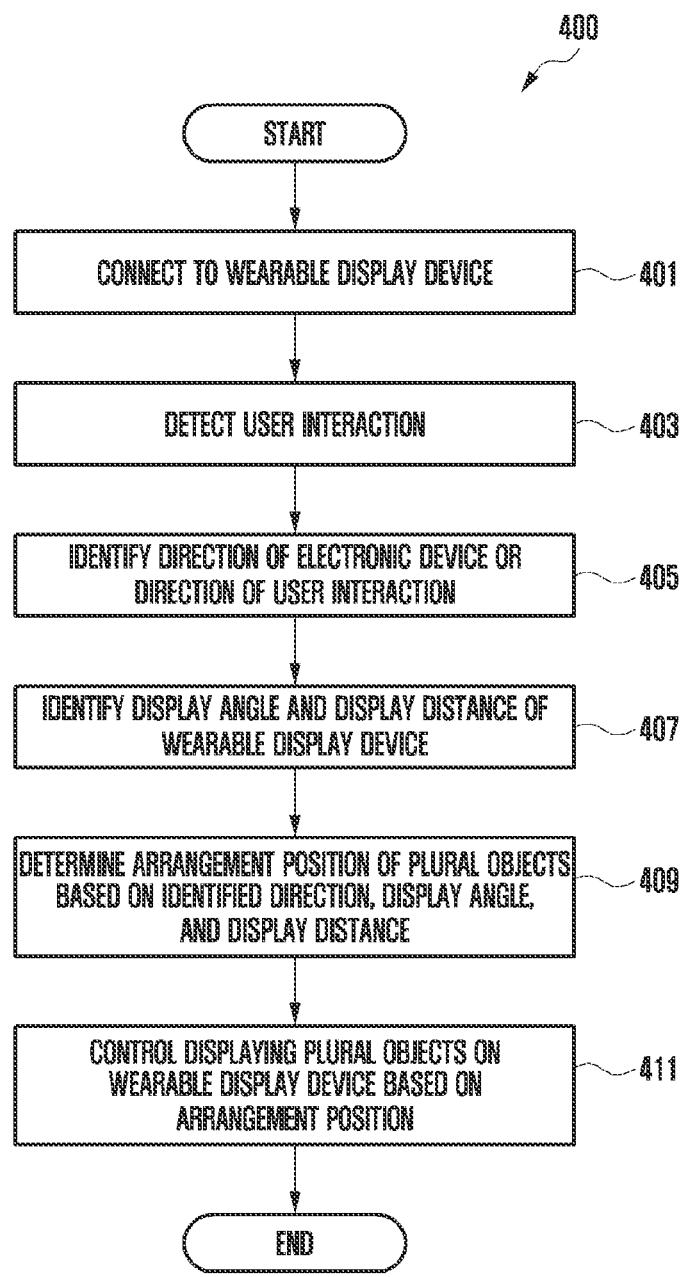
FIG. 4 is a flowchart illustrating an operation method of the electronic device according to various embodiments.

FIG. 4 is a flowchart 400 illustrating an operation method of the electronic device according to various embodiments.

Referring to FIG. 4, at operation 401, the processor (e.g., processor 120 in FIG. 1) of the electronic device (e.g., electronic device 101 in FIG. 1) according to various embodiments may be connected to the wearable display device (e.g., wearable display device 201 in FIG. 2). The wearable display device 201 may be wiredly connected or be wirelessly paired. For example, the processor 120 may be connected to the wearable display device 201 by using short-range wireless communication (e.g., WiFi direct)

through the communication module (e.g., communication module 191 in FIG. 1). When connected to the electronic device 101, the wearable display device 201 may provide (e.g., transmit) at least one piece of information such as image information, device information, sensing information, function information, and/or location information to the electronic device 101.

At operation 403, the processor 120 may detect a user interaction. The user interaction may mean an input (e.g., configured input) for displaying a plurality of objects that are being displayed on the electronic device 101 on the wearable display device 201. The user interaction may include at least one of a touch input through the touch display (e.g., display module 160 in FIG. 1) of the electronic device 101, a motion change of the electronic device 101, or a motion change of a controller connected to the electronic device 101. For example, the touch input may be indicative of touching the display module 160, dragging downward (e.g., scroll down), and then dragging upward (e.g., scroll up), or may be indicative of touching the display module 160, holding for a certain period of time, and then dragging upward.

The motion change of the electronic device 101 may include a user action of gripping and swinging the electronic device 101. Or, the motion change of the controller (e.g., mobile controller) may include a user action of pressing a specific button of the controller and swinging the controller. For example, the processor 120 may detect the user interaction while the electronic device 101 and the wearable display device 201 are connected. The user interaction may be pre-configured in the electronic device 101 or may be configured by the user.

At operation 405, the processor 120 may identify (or detect) the direction of the electronic device 101 or the direction of the user interaction. The processor 120 may detect the direction (or state) of the electronic device 101 by using a geomagnetic sensor or a motion sensor (e.g., sensor module 176 in FIG. 1). In the electronic device 101, the length of two parallel sides of the electronic device housing may be longer or shorter than the length of the other two parallel sides. When the user is looking directly at the touch display (e.g., display module 160 in FIG. 1) of the electronic device 101, the vertical direction (e.g., first direction, y-axis direction) may be a case where the two parallel short sides of the electronic device housing are upward, and the horizontal direction (e.g., second direction, x-axis direction) may be a case where the two parallel long sides of the electronic device housing are upward.

For example, the motion sensor may be a 9-axis motion sensor. The processor 120 may form a virtual coordinate space based on the azimuth (or "yaw"), pitch, and roll values measured by the 9-axis motion sensor, designate one region of the coordinate space as a landscape (e.g., x-axis direction, horizontal direction) range, and designate another region of the coordinate space as a portrait (e.g., y-axis direction) range. The processor 120 may sense (or detect) whether the electronic device 101 is in the horizontal direction or in the vertical direction based on whether the direction of the electronic device belongs to the landscape range or the portrait range. Hereinafter, the direction of the electronic device 101 may be separately described by using two directions (e.g., vertical, horizontal). The direction of the electronic device 101 may be divided into more than two directions (e.g., vertical direction or horizontal direction skewed to the top, bottom, left, or right).

According to various embodiments, the processor 120 may detect the direction of the user interaction from a change in the position (or trajectory) where the user touches the display module 160 and drags. The processor 120 may receive touch information from the touch sensor, and calculate a change in the position of the touch to detect the direction of the user interaction. The touch information may include at least one of touch coordinates, touch intensity, or touch area. For example, the direction of the user interaction may be divided into an upward direction, a downward direction, a left direction, and a right direction, or may include a diagonal direction moving from center to upper left or upper right. Or, the processor 120 may analyze an image received from the wearable display device 201 and detect the direction of the user interaction from the movement direction of the user's hand included in the image. Or, the processor 120 may detect the swinging direction of the electronic device 101 or the swinging direction of the controller as the direction of the user interaction by using the sensor module 176.

At operation 407, the processor 120 may identify the display angle and display distance of the wearable display device 201. When connected to the wearable display device 201, the processor 120 may periodically or selectively receive at least one of image information, sensing information, or location information from the wearable display device 201 through the communication module 190. The processor 120 may calculate the display angle or display distance of the wearable display device 201 by using the received information. Alternatively, the processor 120 may receive a display angle or a display distance from the wearable display device 201. The display angle may mean the viewing angle (FOV or AOV). The range of displaying the real world (or virtual space) shown to the user through the wearable display device 201 may vary according to the display angle. The display angle may be determined with respect to a designated reference point (e.g., center point of the camera FOV) of the wearable display device 201. For example, with respect to the direction indicated by the designated reference point of the wearable display device 201, the direction (or angle) to which the user's gaze is directed, identified through the sensor module 176, or the direction (or angle) indicated by the user's body, identified through the sensor module 176 or the camera module 180, may be obtained (or identified) as the display angle.

According to various embodiments, the display distance may include at least one of a first display distance at which an object is displayed on the glasses (e.g., glasses 310 in FIG. 3), a second display distance separated by a first preset distance from the first display distance, or a third display distance separated by a second preset distance from the second display distance. For example, the first display distance is a distance at which an object is displayed on the glasses 310 and may correspond to a distance closest to the user. The second display distance is a distance allowing up to the user's upper body to be displayed, and may correspond to a distance in a horizontal direction or some distance in a vertical direction. The second display distance may be visible when the user moves the head in the left/right direction, but may be not visible when the user moves the head by more than a specific angle in the up/down direction. The third display distance is a distance allowing up to things (e.g., wall, furniture) that exist in the space where the user is located to be displayed, and may correspond to a distance in a horizontal direction and a vertical direction. The third display distance is a distance visible even if the user moves the head up/down or left/right, and may correspond to a distance farthest from the user.

Although it is described in the drawing that operation 405 is performed first and then operation 407 is performed, the processor 120 may simultaneously perform operations 405 and 407, or perform operation 407 first and then perform operation 405. This is only an implementation issue, and the disclosure is not limited by the description.

At operation 409, the processor 120 may determine the arrangement position of the plurality of objects based on at least one of the identified direction, display angle, or display distance. For example, the objects may include an application icon displayed on the home screen of the electronic device 101, widget information, screens of plural applications, and plural items included in an execution screen of an application. For example, the item may include a contact, an alarm, a photograph, or a document. For example, the plural items may mean a list including plural contacts, a list including plural alarms, a plurality of photographs, or a document composed of plural pages. The processor 120 may identify a plurality of objects displayed on the electronic device 101 when the user interaction is detected.

For example, the processor 120 may determine the location (or distance) at which the plurality of objects are arranged on the display distance based on the speed of the user interaction. For example, the processor 120 may determine the speed of the user interaction based on the touch information. When the electronic device 101 is in the horizontal direction and the user interaction is detected in the vertical direction at a first speed, the processor 120 may control arranging the plurality of objects in a horizontally spread-out manner at the second display distance within the display angle of the wearable display device 201. Or, when the electronic device 101 is in the vertical direction and the user interaction is detected in the vertical direction at a first speed, the processor 120 may control arranging the plurality of objects in a vertically spread-out manner at the second display distance within the display angle of the wearable display device 201.

Or, when the electronic device 101 is in the horizontal direction and the user interaction is detected in the vertical direction at a second speed, the processor 120 may control arranging the plurality of objects in a horizontally spread-out manner at the third display distance within the display angle of the wearable display device 201. When the electronic device 101 is in the vertical direction and the user interaction is detected in the vertical direction at a second speed, the processor 120 may control arranging the plurality of objects in a vertically spread-out manner at the third display distance within the display angle of the wearable display device 201.

According to various embodiments, the processor 120 may determine the number (or amount) of objects to be displayed on the display angle based on the speed of the user interaction. For example, the processor 120 may control disposing a first set number of objects at the first display distance when the user interaction is detected at a first speed, and may control disposing a second set number of objects at the second display distance when the user interaction is detected at a second speed. When the first speed is faster than the second speed, the first set number may be greater than the second set number. Or, the reverse is also possible.

When the direction of the user interaction is a right diagonal direction, the processor 120 may determine the arrangement direction (or position) so that the plurality of objects are displayed in a right direction on the display angle of the wearable display device 201. Or, when the direction of the user interaction is a left diagonal direction, the processor 120 may determine the arrangement position so that the plurality of objects are displayed in a left direction on the display angle of the wearable display device 201.

At operation 411, the processor 120 may control displaying the plurality of objects on the wearable display device 201 based on the arrangement position. The processor 120 may transmit arrangement information including the determined arrangement position and object information (e.g., AR or VR image) corresponding to the plurality of objects to the wearable display device 201. The wearable display device 201 may display a plurality of objects at a corresponding position based on the arrangement information and the object information.

According to various embodiments, after displaying the plurality of objects on the wearable display device 201, the processor 120 may detect a user input for confirming or changing (or rearranging) the arrangement position. Upon receiving an arrangement position change (e.g., rearrangement request) from the user, the processor 120 may perform operations 405 to 409 again. Alternatively, the processor 120 may receive a user input for designating an arrangement position of each object from the user, and change the arrangement position of the plurality of objects according to the user input.

According to various embodiments, when detecting a user interaction for object reclamation through the display module 160, the processor 120 may remove the plurality of objects being displayed on the wearable display device 201. For example, the processor 120 may detect a user interaction of touching the display module 160 and scrolling down while the plurality of objects are displayed on the wearable display device 201. The processor 120 may stop (remove) displaying the plurality of objects on (from) the wearable display device 201 according to the user interaction. Or, upon detecting not wearing of the wearable display device 201, the processor 120 may stop (remove) displaying the plurality of objects on (from) the wearable display device 201.

FIGS. 5A and 5B are diagrams illustrating examples of a user interaction according to various embodiments.

FIG. 5A is a diagram illustrating a first example of a user interaction according to various embodiments.

Referring to FIG. 5A, the processor (e.g., processor 120 in FIG. 1) of the electronic device (e.g., electronic device 101 in FIG. 1) according to various embodiments may detect touching the touch display (e.g., display module 160 in FIG. 1) of the electronic device 101, detect scroll-down 510 of dragging downward, and then detect scroll-up 520 of dragging in an upward direction. When a first user interaction composed of scroll-down 510 and then scroll-up 520 is detected in a state of being connected to the wearable display device (e.g., wearable display device 201 in FIG. 2), the processor 120 may control displaying all objects that are currently displayed on the electronic device 101 on the wearable display device 201. According to various embodiments, the processor 120 may determine the number of objects to be displayed on the wearable display device 201 based on the speed of the first user interaction.

According to various embodiments, the processor 120 may detect hold 530 of touching the display module 160 and sustaining it for a preset time, and then detect scroll-up 540 of dragging in an upward direction. Upon detecting a second user interaction composed of hold 530 and then scroll-up 540, the processor 120 may control displaying plural objects on the wearable display device 201 based on the position of hold 530. The processor 120 may control displaying an object existing at the position of hold 530 and an object located near (or close to) the position, on the wearable display device 201. The processor 120 may determine the number of objects based on the time duration of hold 530. For example, the processor 120 may determine a first number of objects when the time of hold 530 is a first time, and may determine a second number of objects when the time of hold 530 is a second time. The first time may be shorter than the second time, and the first number may be smaller than the second number. For example, it is possible to control displaying a larger number of objects as the time of hold 530 is longer. Or, the reverse is also possible.

FIG. 5B is a diagram illustrating a second example of a user interaction according to various embodiments.

Referring to FIG. 5B, when a motion change of the electronic device 101 is detected through the motion sensor (e.g., sensor module 176 in FIG. 1) in a state of being connected to the wearable display device 201, the processor 120 may determine that a third user interaction 550 has been detected. The third user interaction 550 may include a user action of gripping and swinging the electronic device 101. The swinging action may include an action of throwing the electronic device 101. Alternatively, when a motion change of a controller 570 (e.g., mobile controller) connected to the electronic device 101 is detected, the processor 120 may determine that a fourth user interaction 560 has been detected. The fourth user interaction 560 may include a user action of pressing a specific button of the controller 570 and swinging the controller 570. The controller 570 may be wiredly or wirelessly connected to the electronic device 101. For example, the controller 570 may be connected to the electronic device 101 through short-range wireless communication (e.g., Bluetooth) using the communication module (e.g., communication module 191 in FIG. 1). The controller 570 may control (e.g., select) an AR or VR image in cooperation with the wearable display device 201.

According to various embodiments, the processor 120 may determine the number of objects to be displayed on the wearable display device 201 based on the speed of the motion change (e.g., speed of user interaction).

FIG. 6 is a diagram illustrating an example of the arrangement direction of plural objects in response to the direction of a user interaction according to various embodiments.

Referring to FIG. 6, the processor (e.g., processor 120 in FIG. 1) of the electronic device (e.g., electronic device 101 in FIG. 1) according to various embodiments may determine the arrangement position of plural objects on the display angle of the wearable display device (e.g., wearable display device 201 in FIG. 2) based on the direction of the electronic device 101 or the direction of a user interaction. For example, when the electronic device 101 is in a vertical direction and the user interaction is in a left diagonal direction 610, the processor 120 may determine the arrangement position so that plural objects are displayed in a left direction on the display angle of the wearable display device 201. The left direction on the display angle may mean that arrangement is made to the left with respect to the FOV center point A of the camera included in the wearable display device 201.

According to various embodiments, when the electronic device 101 is in a vertical direction and the user interaction is in a right diagonal direction 630, the processor 120 may determine the arrangement position so that plural objects are displayed in a right direction on the display angle of the wearable display device 201. The right direction on the display angle may mean that arrangement is made to the right with respect to the FOV center point A of the camera included in the wearable display device 201.

Figure 7:
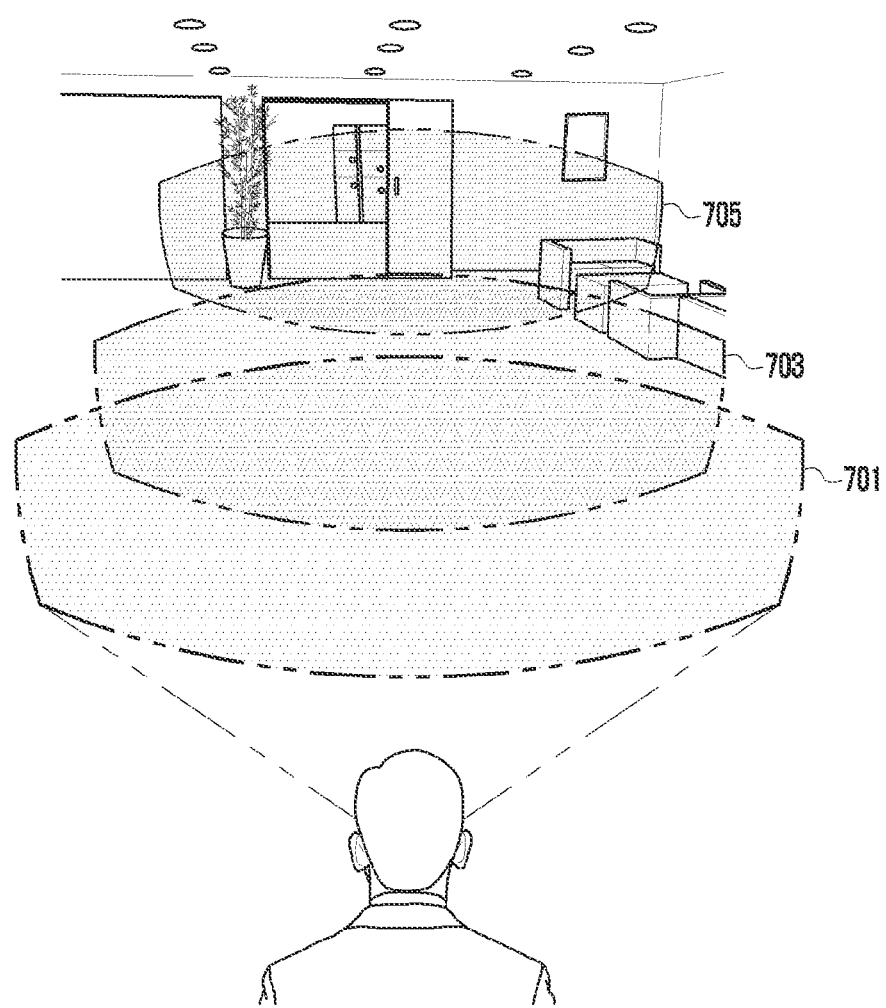
FIG. 7 is a diagram illustrating an example of the arrangement distance of plural objects corresponding to the speed of a user interaction according to various embodiments.

FIG. 7 is a diagram illustrating an example of the arrangement distance of plural objects in response to the speed of a user interaction according to various embodiments.

Referring to FIG. 7, the processor (e.g., processor 120 in FIG. 1) of the electronic device (e.g., electronic device 101 in FIG. 1) according to various embodiments may determine the position (or distance) at which plural objects are disposed on the display distance of the wearable display device (e.g., wearable display device 201 in FIG. 2) based on the speed of a user interaction. For example, when connected to the wearable display device 201, the processor 120 may periodically, in real time, or selectively receive at least one of image information, sensing information, or location information from the wearable display device 201. The processor 120 may calculate the display angle or display distance of the wearable display device 201 by using the received information. Alternatively, the processor 120 may receive the display angle or display distance from the wearable display device 201.

The display distance (or display position) may mean a distance away from the user. For example, a first display distance 701 indicates that an object is displayed on the glasses (e.g., glasses 310 in FIG. 3), and may correspond to the distance closest to the user wearing the wearable display device 201. Or, the first display distance 701 may indicate that the position of the object displayed on the glasses 310 is fixed with respect to the position of the electronic device 101. A second display distance 703 is separated by a first preset distance (e.g., 30 cm, 50 cm, 1 m) from the first display distance 701, and may be, for example, a distance allowing up to the user's upper body to be displayed, which may correspond to a distance in a horizontal direction or some distance in a vertical direction.

The second display distance 703 may indicate that the position of an object is fixed with respect to the user wearing the glasses 310. The second display distance 703 may be visible when the user moves the head in the left/right direction, but may be not visible when the user moves the head by more than a specific angle in the up/down direction. For example, a third display distance 705 is a distance allowing up to things (e.g., wall, furniture) that exist in the space where the user is located to be displayed, and may correspond to a distance in a horizontal direction and a vertical direction. The third display distance 705 may indicate that the position of an object is fixed with respect to an absolute location. The third display distance 705 is a distance visible even if the user moves the head up/down or left/right, and may correspond to a distance farthest from the user.

According to various embodiments, the processor 120 may fix the position at which an object is displayed to one of the first to third display distances 701 to 705 based on a user input. The processor 120 may determine the arrangement position of objects within the same display distance or within different display distances according to the attribute of the objects. The attribute of an object may include at least one of time, history (or frequency), file, or application. For example, according to the time attribute of the object, the processor 120 may control arranging plural objects at different positions in a horizontal direction (e.g., from left to right, x-axis) of the wearable display device 201. In the case of a horizontal direction, the processor 120 may determine different arrangement positions for objects within the same display distance.

Or, according to the usage history attribute or file attribute of the object, the processor 120 may control arranging plural objects at different positions in a depth direction (e.g., from front to back, z-axis) of the wearable display device 201. In the case of a depth direction, the processor 120 may determine different arrangement positions at different display distances for objects. For example, according to the usage history attribute or file attribute of the object, the processor 120 may control arranging plural objects between the first display distance 701 and the second display distance 703.

Or, according to the application attribute of the object, the processor 120 may control arranging plural objects at different positions in at least one of a horizontal direction, a vertical direction (e.g., top to bottom, y-axis), or a depth direction of the wearable display device 201. For objects having a first application attribute corresponding to the horizontal direction (e.g., mainly in a form of being attached to a wall such as a clock, timer, and calendar), the processor 120 may determine different arrangement positions (e.g., left and right sides) within the same display distance for the objects. For objects having a second application attribute corresponding to the vertical direction (e.g., objects mainly in a form of being placed on a flat surface such as paper, or a notebook), the processor 120 may determine different arrangement positions (e.g., bottom surface) within the same display distance for the objects. For objects having a third application attribute corresponding to the depth direction (e.g., images, moving images), the processor 120 may determine different arrangement positions (e.g., front surface) at different display distances for the objects.

FIGS. 8A to 8F are diagrams illustrating examples of displaying a plurality of objects on the wearable display device according to various embodiments.

Figure 8A:
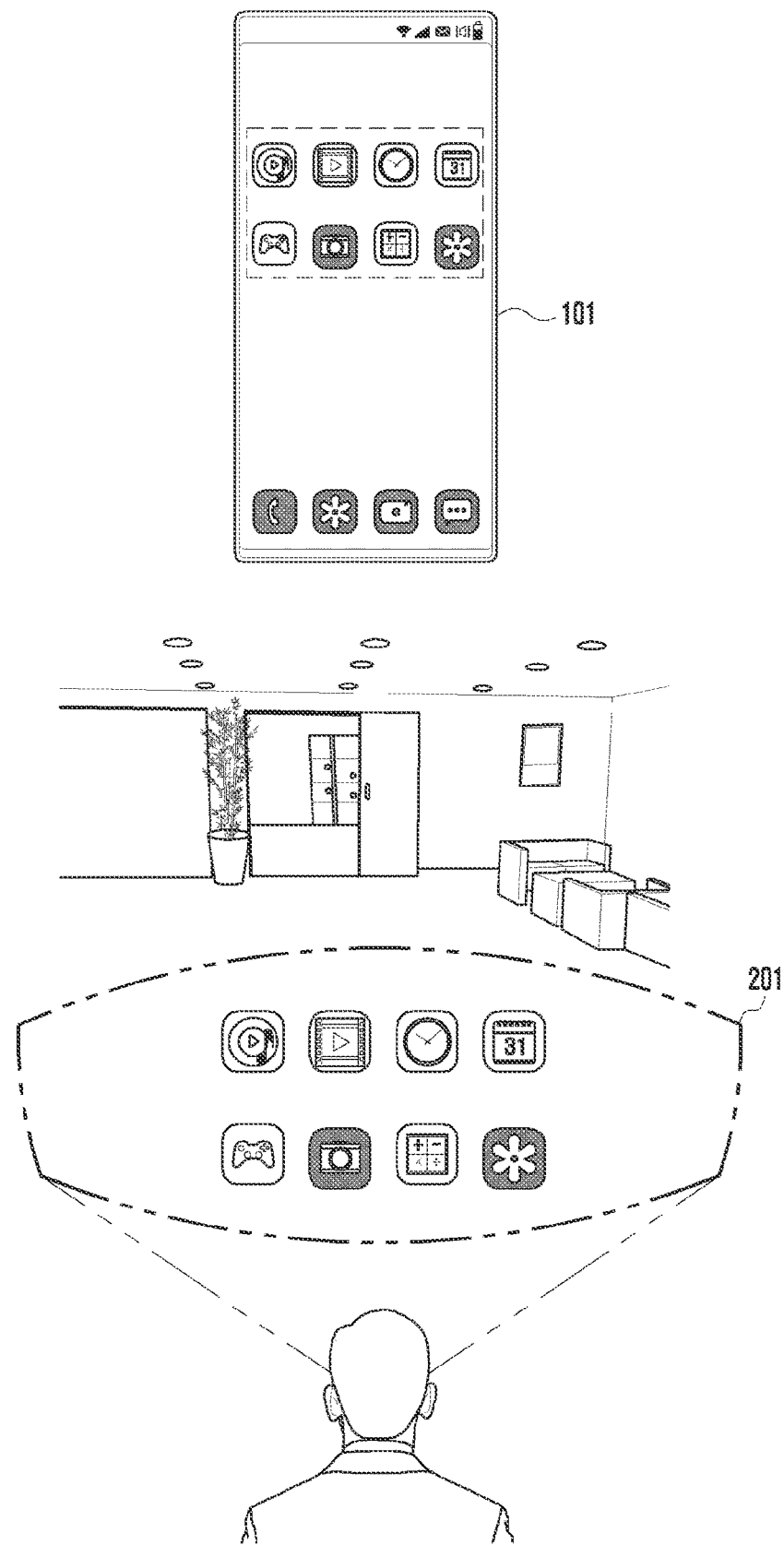

FIG. 8A is a diagram illustrating a first example of displaying a plurality of objects on the wearable display device according to various embodiments.

Referring to FIG. 8A, the processor (e.g., processor 120 in FIG. 1) of the electronic device (e.g., electronic device 101 in FIG. 1) according to various embodiments may display application icons that are displayed on the home screen of the electronic device 101 as objects on the wearable display device (e.g., wearable display device 201 in FIG. 2). In a state where the home screen is displayed on the electronic device 101, when the electronic device 101 is in a vertical direction, the direction of the user interaction is upward, and the speed of the user interaction is a first speed, the processor 120 may display the home screen at a second display distance (e.g., second display distance 703 in FIG. 7) on the display angle of the wearable display device 201.

According to various embodiments, when the number of objects is large or all objects cannot be displayed within the display distance, the processor 120 may change the arrangement position (or configuration) of the objects. For example, when nine objects are displayed in a 3*3 matrix form on the home screen, the nine objects may be not displayed in a vertical direction within the display angle or the display distance. For three objects arranged in a 3*3 matrix form in a vertical direction on the home screen, the processor 120 may change the arrangement position (or configuration) of the objects to 2*2*2*2*1 in a horizontal direction within the wearable display device 201. Alternatively, according to the attribute of the object, the processor 120 may arrange four objects at a first display distance (e.g., first display distance 701 in FIG. 7) in a depth direction within the wearable display device 201, arrange four objects at a second display distance 703, and arrange one object at a third display distance (e.g., third display distance 705 in FIG. 7).

FIG. 8B is a diagram illustrating a second example of displaying a plurality of objects on the wearable display device according to various embodiments.

Figure 8C:
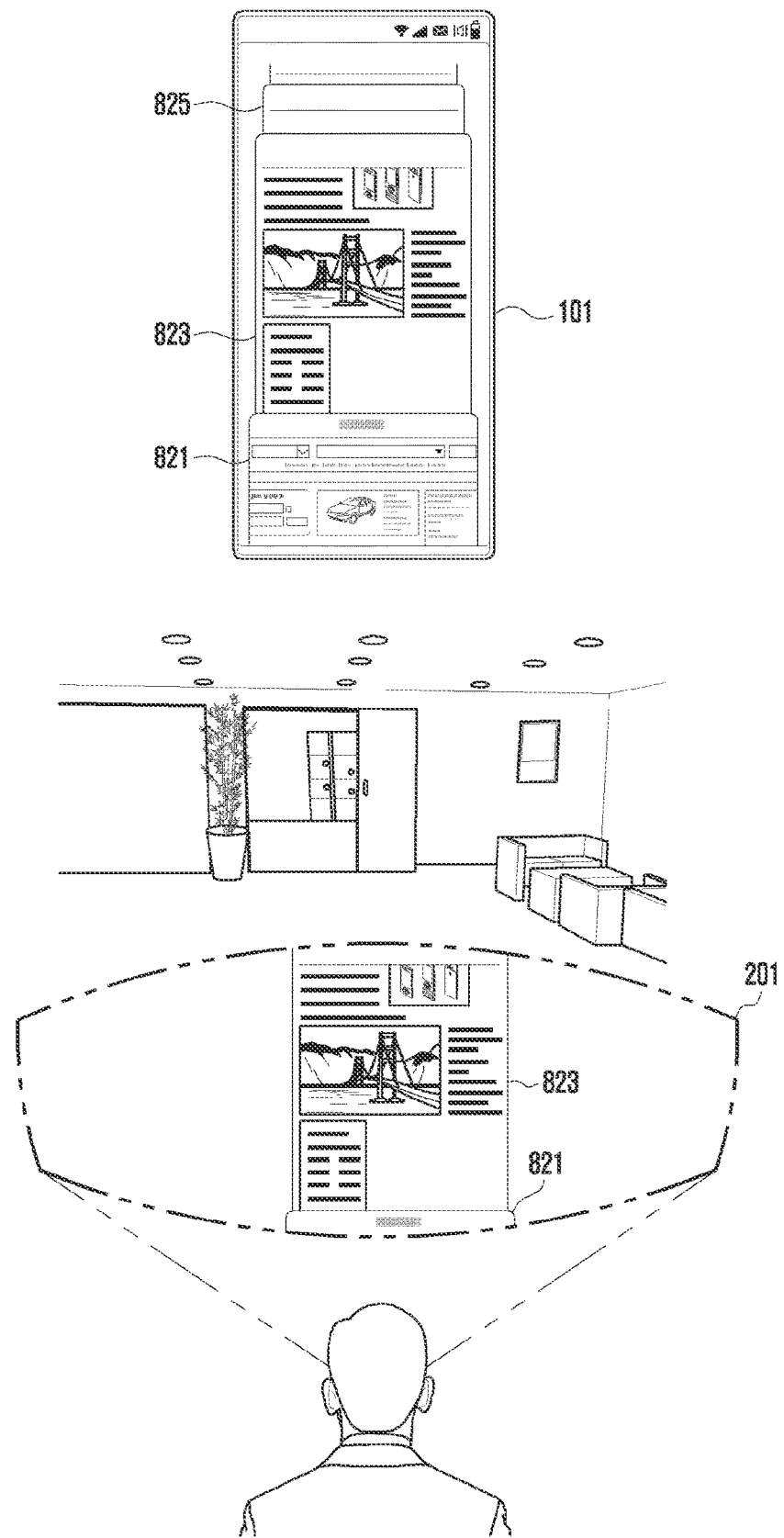

Referring to FIG. 8B, the processor 120 may display widget information of the electronic device 101 as an object on the wearable display device 201. In a state where plural widget information (e.g., weather information 801, schedule information 803, information 805 about a plurality of frequently used applications, contact information 807) is displayed on the electronic device 101, when the electronic device 101 is in a vertical direction, the direction of the user interaction is upward, and the speed of the user interaction is a second speed, the processor 120 may display the plural widget information at a third display distance 705 on the display angle of the wearable display device 201. According to various embodiments, based on the attribute of the object, the processor 120 may arrange first widget information 811, second widget information 813, third widget information 815, and fourth widget information 817 in a horizontal direction from left to right within the third display distance 705 of the wearable display device 201. FIG. 8C is a diagram illustrating a third example of displaying a plurality of objects on the wearable display device according to various embodiments.

Referring to FIG. 8C, the processor 120 may display screens of plural applications as objects on the wearable display device 201. The plural applications may refer to applications that are being executed on the electronic device 101 or being executed in the background. In a state where a plurality of application screens (e.g., screen 821 of a first application, screen 823 of a second application, and screen 825 of a third application) are displayed on the electronic device 101, when the electronic device 101 is in a vertical direction, the direction of the user interaction is upward, and the speed of the user interaction is a third speed, the processor 120 may display the plurality of application screens at a first display distance 701 on the display angle of the wearable display device 201. According to various embodiments, based on the attribute of the object (e.g., application with a high usage history), the processor 120 may arrange the first application screen 821, the second application screen 823, and the third application screen 825 in a vertical direction from top to bottom within the first display distance 701 of the wearable display device 201.

Figure 8D:
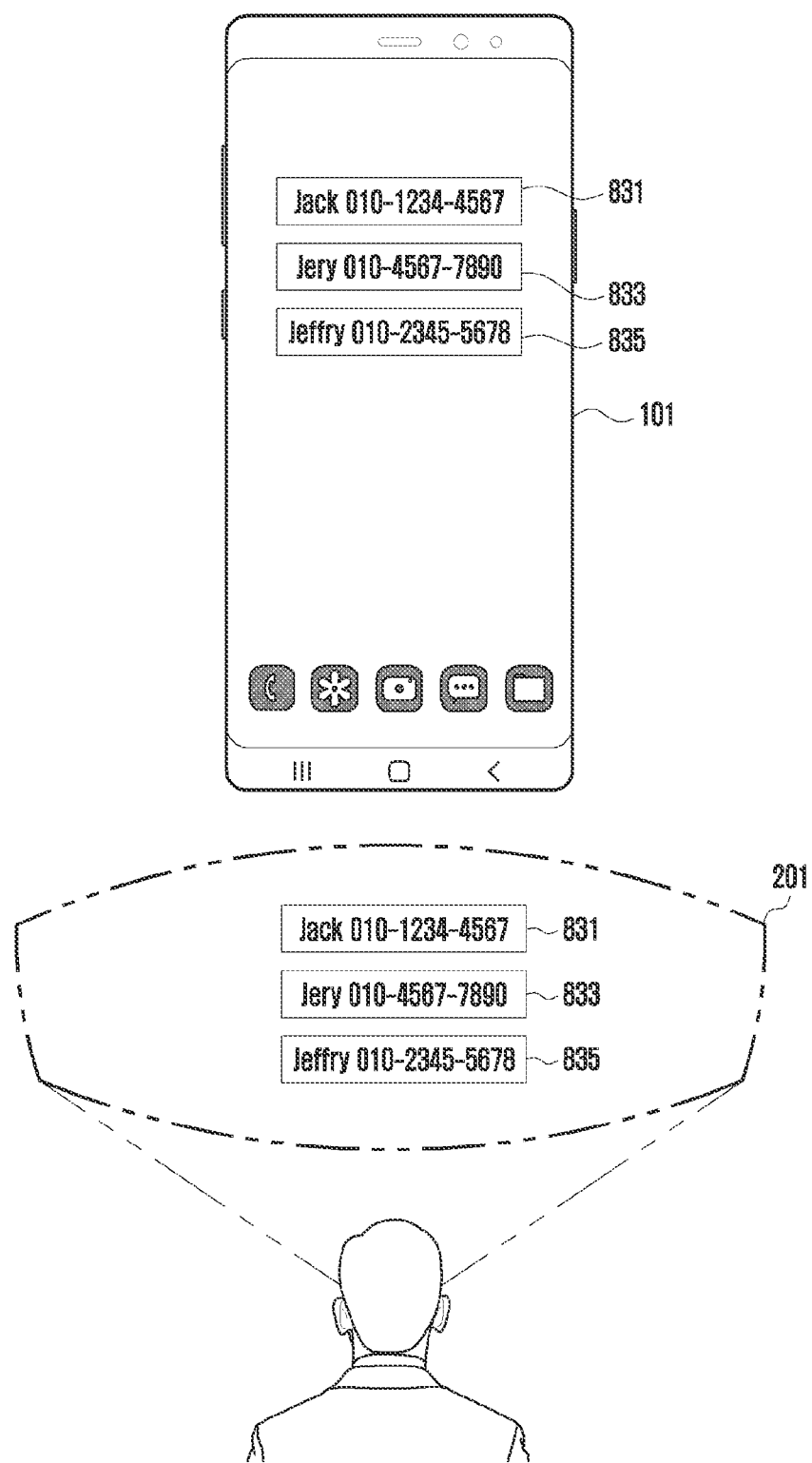

FIG. 8D is a diagram illustrating a fourth example of displaying a plurality of objects on the wearable display device according to various embodiments.

Referring to FIG. 8D, the processor 120 may display a list of plural contacts as objects on the wearable display device 201. The list of plural contacts may include contact information stored in the memory (e.g., memory 130 in FIG. 1) of the electronic device 101. In a state where a list of plural contacts (e.g., first contact information 831, second contact information 833, third contact information 835) is displayed on the electronic device 101, when the electronic device 101 is in a vertical direction, the direction of the user interaction is upward, and the speed of the user interaction is a second speed, the processor 120 may display the list of plural contacts at a second display distance 703 on the display angle of the wearable display device 201. According to various embodiments, based on the attribute of the object (e.g., frequently used contact), the processor 120 may arrange first contact information 831, second contact information 833, and third contact information 834 in a vertical direction from top to bottom within a second display distance 703 of the wearable display device 201.

Figure 8E:
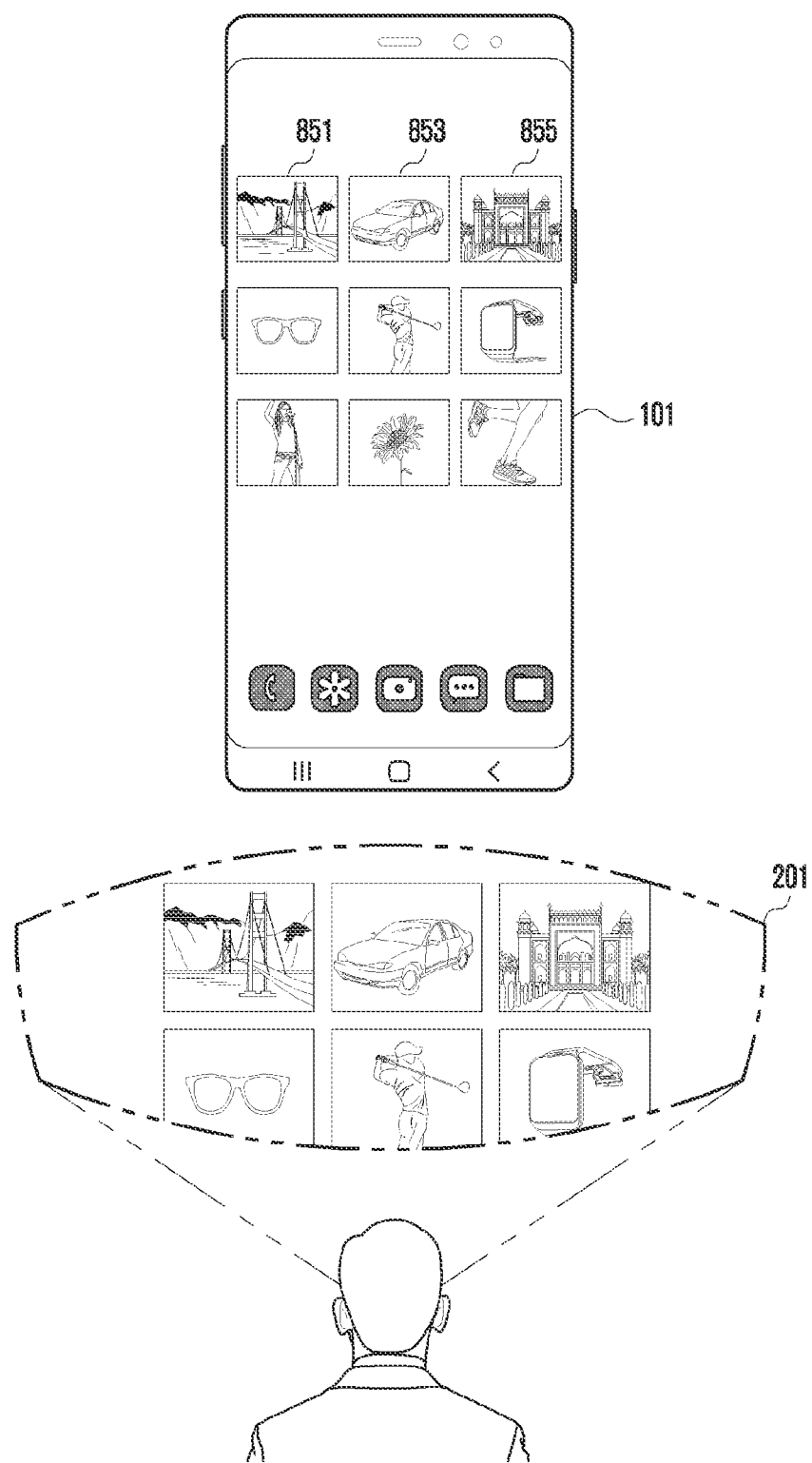

FIG. 8E is a diagram illustrating a fifth example of displaying a plurality of objects on the wearable display device according to various embodiments.

Referring to FIG. 8E, the processor 120 may display a list of plural photographs as objects on the wearable display device 201. The list of plural photographs may include photographs stored in the memory 130 of the electronic device 101. In a state where a list of plural photographs (e.g., first photograph 851, second photograph 853, third photograph 855) is displayed on the electronic device 101, when the electronic device 101 is in a vertical direction, the direction of the user interaction is upward, the speed of the user interaction is a second speed, and the hold time of the user interaction is a first time, the processor 120 may display a set photograph list at a second display distance 703 on the display angle of the wearable display device 201. According to various embodiments, the processor 120 may allow a list of all photographs currently displayed on the electronic device 101 (e.g., 12 photographs) to be displayed on the wearable display device 201 when the user touches a location where one photograph is present and holds it for a first time, or may allow a list of some photographs currently displayed on the electronic device 101 (e.g., 9 photographs) to be displayed on the wearable display device 201 when the hold time is a second time. The first time may be longer than the second time. Or, when the speed of the user interaction is a first speed (e.g., high speed), the processor 120 may control displaying a list of all photographs currently displayed on the electronic device 101 (e.g., 12 photographs) on the wearable display device 201. Or, when the speed of the user interaction is a second speed (e.g., low speed), the processor 120 may control displaying a list of some photographs currently displayed on the electronic device 101 (e.g., 9 photographs) on the wearable display device 201. The first speed may be faster than the second speed.

FIG. 8F is a diagram illustrating a sixth example of displaying a plurality of objects on the wearable display device according to various embodiments.

Referring to FIG. 8F, the processor 120 may display a plurality of pages as objects on the wearable display device 201. The plurality of pages may include a document (e.g., electronic book) stored in the memory 130 of the electronic device 101. In a state where plural pages (e.g., first page 871, second page 873, third page 875) are displayed on the electronic device 101, when the electronic device 101 is in a vertical direction, the direction of the user interaction is upward, and the speed of the user interaction is a third speed, the processor 120 may display the plural pages at a third display distance 705 on the display angle of the wearable display device 201. According to various embodiments, based on the attribute (e.g., document) of the object, the processor 120 may arrange the first page 871, the second page 873, and the third page 875 in a vertical direction or a depth direction of the wearable display device 201.

Figure 9:
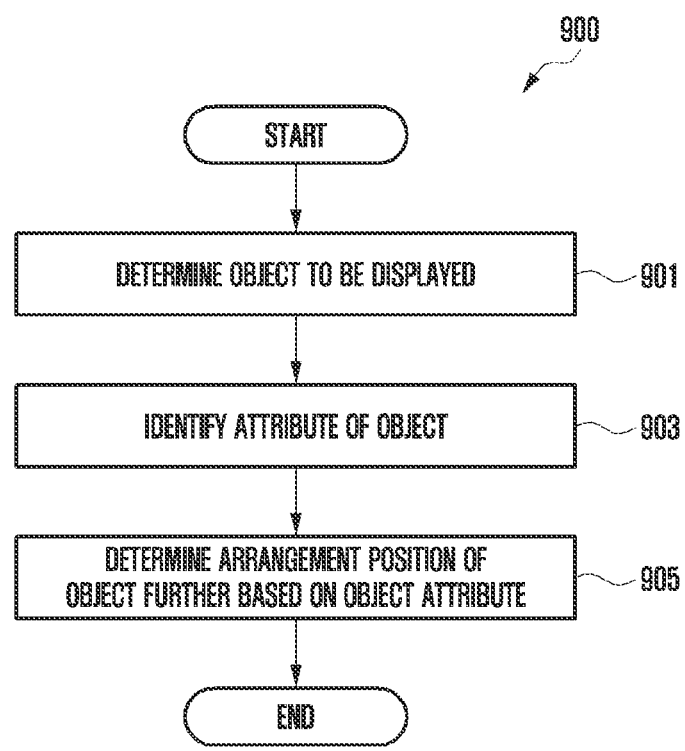
FIG. 9 is a flowchart illustrating a method for the electronic device to determine the arrangement position based on an object attribute according to various embodiments.

FIG. 9 is a flowchart 900 illustrating a method for the electronic device to determine the arrangement position based on an object attribute according to various embodiments.

Referring to FIG. 9, at operation 901, the processor (e.g., processor 120 in FIG. 1) of the electronic device (e.g., electronic device 101 in FIG. 1) according to various embodiments may determine an object to be displayed. In a state of being connected to the wearable display device (e.g., wearable display device 201 in FIG. 2), the processor 120 may determine an object to be displayed on the wearable display device 201 based on a detected user interaction. Upon detecting a user interaction of touching the touch display (e.g., display module 160 in FIG. 1), dragging downward, and then dragging upward, the processor 120 may determine all objects that are currently displayed on the electronic device 101 as objects to be displayed on the wearable display device 201.

According to various embodiments, upon detecting a user input of touching the display module 160, holding for a specific time, and then dragging upward, the processor 120 may determine the number of objects to be displayed on the wearable display device 201 based on the hold time. For example, the processor 120 may determine a first number of objects when the hold time is a first time, and may determine a second number of objects when the hold time is a second time. The first time may be shorter than the second time, and the first number may be smaller than the second number. For example, it is possible to control displaying a larger number of objects as the hold time is longer. Or, the reverse is also possible.

The processor 120 may determine a first number of objects when the speed of the user input of holding and then dragging upward is a first speed, and may determine a second number of objects when the speed of the user input of holding and then dragging upward is a second speed. The first speed may be faster than the second speed, and the first number may be greater than the second number. For example, it is possible to control displaying a larger number of objects as the speed of the user input is faster. Or, the reverse is also possible.

At operation 903, the processor 120 may identify the attribute of the determined object. The attribute of an object may include at least one of time, history (or frequency), file, or application. The time attribute may mean the creation time of an object (e.g., photograph creation time or document creation time) or the recently used time of an object (e.g., recently used time of an application). The usage history attribute may mean an object that is most frequently used, frequently used, or rarely used. The file attribute may mean the size or volume of an object. The application attribute is based on the display attribute of an application, and may include, for example, a first application attribute with a characteristic (or form) of being mainly attached to a wall, such as a clock, a timer, or a calendar, a second application attribute with a characteristic of being mainly placed on a flat surface, such as paper or a notebook, and a third application attribute with dynamic graphic information such as an image or a moving image. The application attributes may be classified more or less than those described above.

Operations 901 and 903 may be performed while operation 405 or operation 407 in FIG. 4 is being performed.

At operation 905, the processor 120 may determine the arrangement position of objects further based on the attribute of the objects. The processor 120 may determine the arrangement position of plural objects according to the attribute of the objects in addition to at least one of the direction of the electronic device 101, the direction of the user interaction, the speed of the user interaction, the display angle of the wearable display device 201, or the display distance thereof. For example, the processor 120 may control arranging a plurality of objects in a horizontal direction (e.g., left to right, x-axis) of the wearable display device 201 according to the time attribute of the objects. In the case of a horizontal direction, the processor 120 may determine different arrangement positions of objects within the same display distance.

Or, according to the usage history attribute or file attribute of objects, the processor 120 may control arranging plural objects in a depth direction (e.g., front to back, z-axis) of the wearable display device 201. In the case of a depth direction, the processor 120 may determine different arrangement positions at different display distances for objects. For example, according to the usage history attribute or file attribute of objects, the processor 120 may control arranging plural objects between a first display distance 701 and a second display distance 703.

Or, according to the application attribute of objects, the processor 120 may control arranging plural objects in at least one of a horizontal direction, a vertical direction (e.g., top to bottom, y-axis), or a depth direction of the wearable display device 201. For objects having a first application attribute corresponding to the horizontal direction (e.g., mainly in a form of being attached to a wall such as a clock, timer, and calendar), the processor 120 may determine different arrangement positions (e.g., left and right sides) within the same display distance for the objects. For objects having a second application attribute corresponding to the vertical direction (e.g., objects mainly in a form of being placed on a flat surface such as paper, or a notebook), the processor 120 may determine different arrangement positions (e.g., bottom surface) within the same display distance for the objects. For objects having a third application attribute corresponding to the depth direction (e.g., images, moving images), the processor 120 may determine different arrangement positions (e.g., front surface) at different display distances for the objects.

Figure 10:
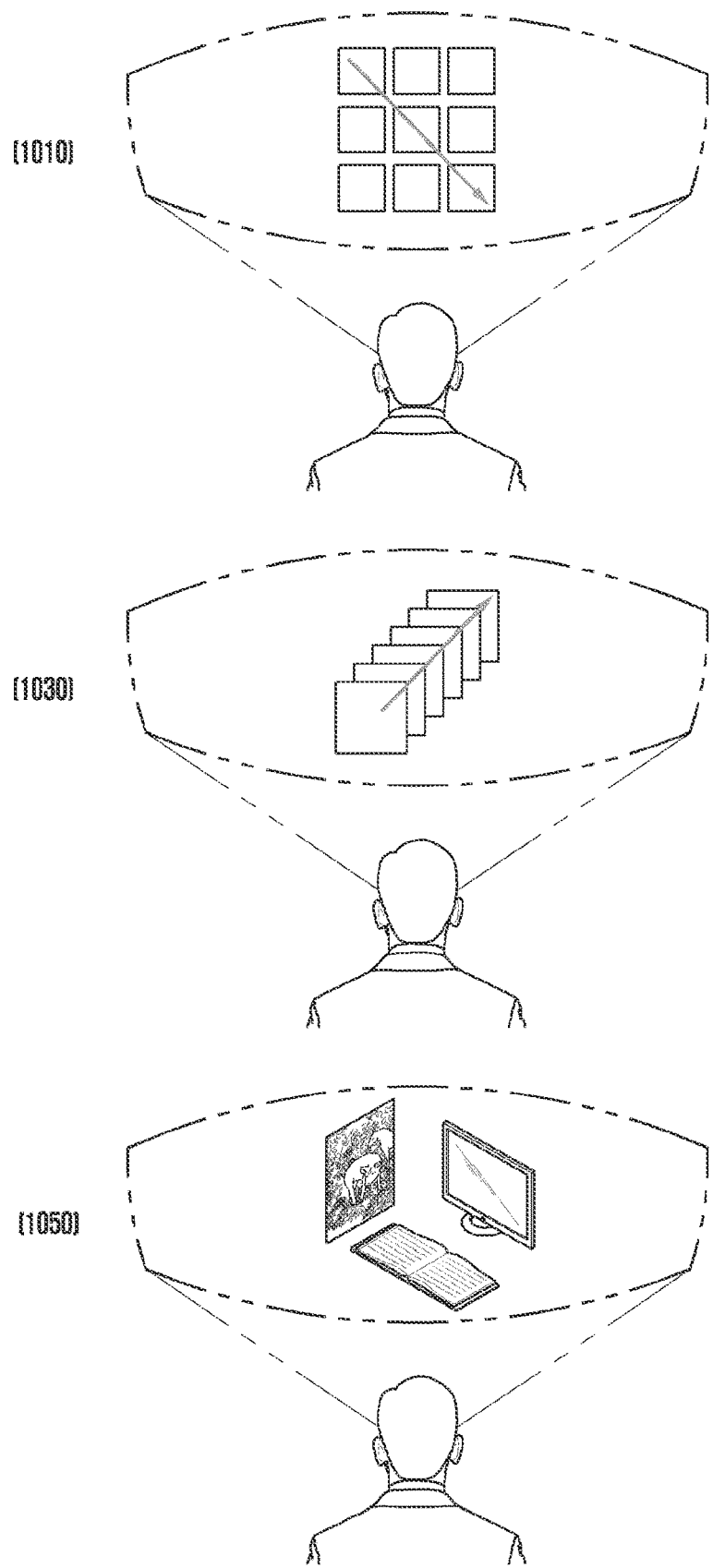
FIG. 10 is a diagram illustrating an example of displaying a plurality of objects on the wearable display device based on object attributes according to various embodiments.

FIG. 10 is a diagram illustrating an example of displaying a plurality of objects on the wearable display device based on object attributes according to various embodiments.

Referring to FIG. 10, the processor (e.g., processor 120 in FIG. 1) of the electronic device (e.g., electronic device 101 in FIG. 1) according to various embodiments may determine different arrangement directions (or positions) for objects to be displayed on the wearable display device (e.g., wearable display device 201 in FIG. 2) based on the time attribute of the objects. For example, the processor 120 may display the objects in a first arrangement direction 1010 according to the creation time of the objects (e.g., photograph creation time or document creation time) or the recently used time of the objects (e.g., recently used time of applications). In the first arrangement direction 1010, when a plurality of objects are displayed in a matrix form, the plurality of objects may be arranged in newest to oldest order in a diagonal direction from top to bottom on the wearable display device 201.

According to various embodiments, the processor 120 may determine different arrangement directions (or positions) for objects based on the usage history attribute or file attribute of the objects. For example, the processor 120 may display the objects in order of usage frequency from highest to lowest in a second arrangement direction 1030. In the second arrangement direction 1030, a plurality of objects may be arranged in a depth direction (e.g., from front to back, z-axis) of the wearable display device 201, where the most recently used object may be placed in the front and objects that have been used long ago may be placed in the back.

According to various embodiments, the processor 120 may display objects in a third arrangement direction 1050 according to the application attribute of the objects. The third arrangement direction 1050 may indicate that plural objects are arranged in at least one of a horizontal direction, a vertical direction, or a depth direction of the wearable display device 201. For example, the third arrangement direction 1050 may indicate that for objects corresponding to a first application attribute (e.g., a main characteristic of being attached to a wall, such as a clock, timer, or calendar), the corresponding objects are arranged on the side surface (e.g., left and right sides) or the front surface on the display angle of the wearable display device 201. Also, the third arrangement direction 1050 may indicate that for objects corresponding to a second application attribute (e.g., a main characteristic of being placed on a flat surface, such as paper and a notebook), the corresponding objects are arranged on the bottom surface on the display angle of the wearable display device 201. In addition, the third arrangement direction 1050 may indicate that for objects corresponding to a third application attribute (e.g., image, moving image), the corresponding objects are arranged on the front surface on the display angle of the wearable display device 201.

FIG. 11 is a flowchart 1100 illustrating a method for the electronic device to recognize a target object and display a plurality of objects according to various embodiments.

Referring to FIG. 11, at operation 1101, the processor (e.g., processor 120 in FIG. 1) of the electronic device (e.g., electronic device 101 in FIG. 1) according to various embodiments may recognize a target object. In a state of being connected to the wearable display device (e.g., wearable display device 201 in FIG. 2), the processor 120 may obtain an image from the wearable display device 201. The obtained image may have been captured by the camera of the wearable display device 201. The wearable display device 201 may transmit an image captured by the camera to the electronic device 101 in real time. The processor 120 may analyze the obtained image to recognize the target object. Alternatively, the wearable display device 201 may recognize the target object, and the processor 120 may receive information on the target object from the wearable display device 201. The information on the target object may indicate what the target object is. For example, the target object may be an IoT device such as a car or a refrigerator, or a person.

At operation 1103, the processor 120 may detect a user interaction. The user interaction may mean an input (e.g., configured input) for displaying a plurality of objects that are being displayed on the electronic device 101 on the wearable display device 201. The user interaction may include at least one of a touch input through the touch display (e.g., display module 160 in FIG. 1) of the electronic device 101, a motion change of the electronic device 101, or a motion change of a controller connected to the electronic device 101. For example, the touch input may be indicative of touching the display module 160, dragging downward (e.g., scroll down), and then dragging upward (e.g., scroll up), or may be indicative of touching the display module 160, holding for a certain period of time, and then dragging upward. The motion change of the electronic device 101 may include a user action of gripping and swinging the electronic device 101. Or, the motion change of the controller (e.g., mobile controller) may include a user action of pressing a specific button of the controller and swinging the controller. As operation 1103 is identical or similar to operation 403 in FIG. 4, a detailed description thereof may be omitted.

At operation 1105, the processor 120 may identify an object associated with the target object. The processor 120 may identify a plurality of objects associated with the target object from among objects stored in the memory (e.g., memory 130 in FIG. 1). For example, when the target object is a car, the object associated with the target object may mean an application related to the car (e.g., navigation application, smart key). The processor 120 may identify an application related to a car among applications installed in the electronic device 101 as an object. According to various embodiments, the processor 120 may identify, as an object, an application that is not installed in the electronic device 101 but can be installed in relation to a car. Or, when the target object is a person, the object associated with the target object may mean a photograph, contact, or schedule corresponding to the face recognized through face recognition.

At operation 1107, the processor 120 may identify the distance or direction of the target object. The wearable display device 201 may include various sensors (e.g., sensor module 176, camera module 180), and may measure the distance and direction to the target object based on sensing information by using at least one sensor. The wearable display device 201 may use at least one sensor such as an infrared sensor, a ToF sensor (or ToF camera), an AR camera, and/or a next-generation AR camera (e.g., lidar sensor) to emit a specified signal (e.g., infrared ray, light source, laser) toward a subject (e.g., target object) and measure the time for the output signal to be reflected by the subject and to return, to thereby estimate the distance and direction to the target object. Or, the wearable display device 201 may periodically or in real time provide (e.g., transmit) at least one information such as image information, device information, sensing information, function information, and/or location information to the electronic device 101. The processor 120 may calculate the distance and direction to the target object by using the received information. Although operation 1107 is described as being performed after operation 1105 in the drawing, operation 1107 may be obtained (or determined) while operations 1101 to 1105 are being performed.

According to various embodiments of the disclosure, the processor 120 may identify the display angle and display distance of the wearable display device 201. The display angle may mean the field of view (FOV) or angle of view (AOV). The range of displaying the real world (or virtual space) shown to the user through the wearable display device 201 may vary according to the display angle. The display angle may be determined with respect to a designated reference point (e.g., center point of the camera FOV) of the wearable display device 201. As operation 1107 is identical or similar to operation 407 in FIG. 4, a detailed description thereof may be omitted.

At operation 1109, the processor 120 may determine the arrangement position of the identified object based on the distance or direction of the target object. The processor 120 may control disposing the identified object close to the target object. The processor 120 may apply a different degree of proximity (distance) to the target object or object size according to the level of association between the target object and the identified object or the object attribute. As the attribute of an object has been described in detail above, a description thereof may be simplified. If the level of association between the target object and the identified object is high, or in order of the object attribute, the processor 120 may arrange the identified object closer to the target object or increase the size of the identified object. If the level of association between the target object and the identified object is low, or in order of the object attribute, the processor 120 may arrange the identified object farther from the target object or decrease the size of the identified object.

At operation 1111, the processor 120 may control displaying the identified objects on the wearable display device 201 based on the arrangement position. The processor 120 may transmit arrangement information including the determined arrangement position and object information (e.g., AR or VR image) corresponding to the identified objects to the wearable display device 201. The wearable display device 201 may display a plurality of objects at corresponding positions based on the arrangement information and the object information. The processor 120 may control displaying an object included in the memory 130 of the electronic device 101 and a downloadable object in a distinct manner. For example, the processor 120 may control displaying an object included in the memory 130 thicker or larger than a downloadable object. Or, the processor 120 may control displaying an object included in the memory 130 closer to the target object than a downloadable object.

FIGS. 12A to 12D are diagrams illustrating examples of recognizing a target object and displaying a plurality of objects on the wearable display device according to various embodiments.

Figure 12A:
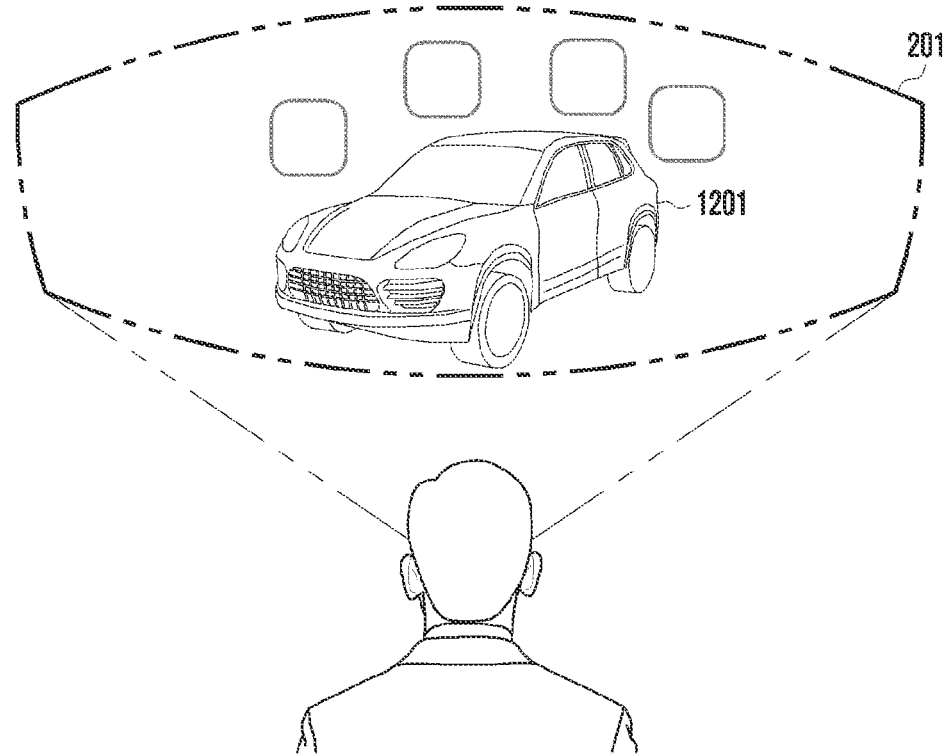
FIGS. 12A to 12D are diagrams illustrating examples of recognizing a target object and displaying a plurality of objects on the wearable display device according to various embodiments.

FIG. 12A is a diagram illustrating an example of recognizing a car and displaying a plurality of objects associated with the car on a wearable display device according to various embodiments.

Referring to FIG. 12A, the processor (e.g., processor 120 in FIG. 1) of the electronic device (e.g., electronic device 101 in FIG. 1) according to various embodiments may obtain an image from the wearable display device (e.g., wearable display device 201 of FIG. 2) in a state of being connected to the wearable display device 201. The obtained image may have been captured by the camera of the wearable display device 201. The processor 120 may analyze the image to recognize a car 1201 as the target object. When a user input for display on the wearable display device 201 is detected, the processor 120 may identify an object associated with the car 1201. The object may be an application associated with the car 1201 such as a navigation application or a smart key among applications installed in the electronic device 101. The processor 120 may identify, as an object, an application that is not installed in the electronic device 101 but can be installed in relation to the car 1201.

The processor 120 may identify the distance or direction of the car 1201 or may determine the arrangement position of the identified object based on the distance or direction of the car 1201. The processor 120 may receive sensing information from the wearable display device 201 and identify (or calculate) the distance or direction of the car 1201 based on the sensing information. The processor 120 may determine the arrangement position of the identified object so that the identified object is arranged close to the car 1201 based on the distance or direction of the car 1201. The processor 120 may control displaying the identified object on the wearable display device 201 based on the arrangement position. The processor 120 may transmit arrangement information including the determined arrangement position and object information (e.g., AR or VR image) corresponding to the identified object to the wearable display device 201. The processor 120 may control displaying an application installed in the electronic device 101 and an application not installed in the electronic device 101 in a distinct manner. For example, the processor 120 may display an application installed in the electronic device 101 thicker or larger than an installable application. Or, the processor 120 may control displaying an application installed in the electronic device 101 closer to the car 1201 than an installable application.

Figure 12B:
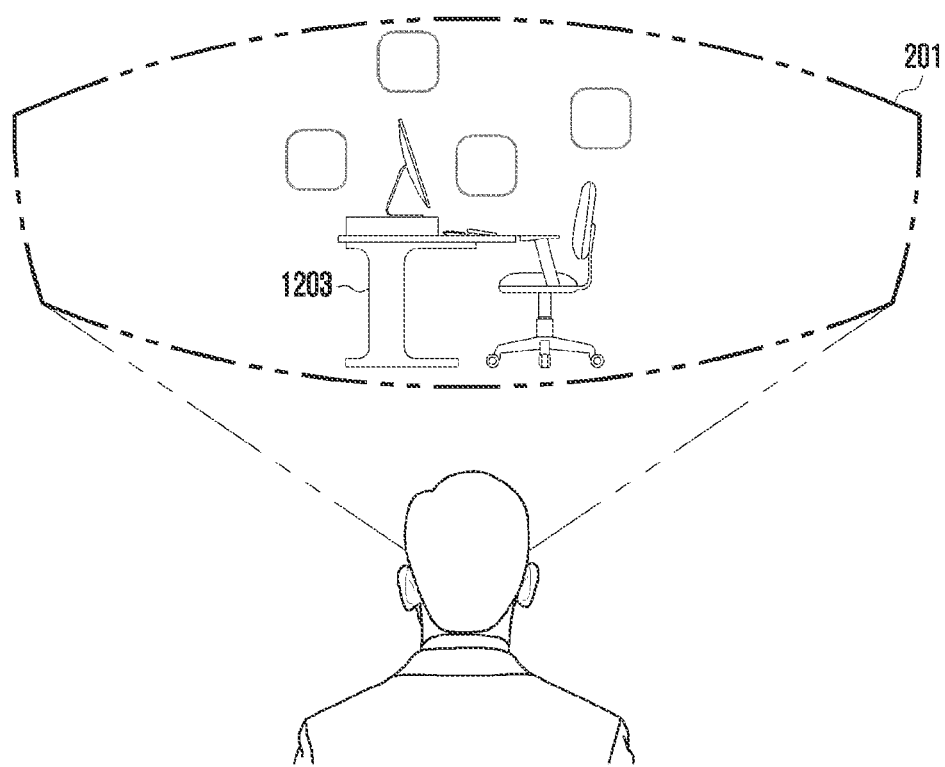

FIG. 12B is a diagram illustrating an example of recognizing a desk and displaying a plurality of objects associated with the desk on a wearable display device according to various embodiments.

Referring to FIG. 12B, the processor 120 may obtain an image from the wearable display device 201 in a state of being connected to the wearable display device 201. The processor 120 may analyze the image to recognize a desk 1203 as the target object. When a user input for display on the wearable display device 201 is detected, the processor 120 may identify an object associated with the desk 1203. The object may be an object associated with the desk 1203, such as a document (e.g., word file, PDF), messenger (e.g., email), artificial intelligence, or an application related to a document, messenger, or artificial intelligence, among objects stored in the memory 130 (or installed in the electronic device 101). The processor 120 may identify, as an object, an application that is not installed in the electronic device 101 but can be installed in relation to the desk 1203. According to various embodiments, when the desk 1203 is recognized, based on the location information of the electronic device 101, the processor 120 may identify different objects according to whether the location information indicates a home or an office.

The processor 120 may identify the distance or direction of the desk 1203 and may determine the arrangement position of the identified objects based on the distance or direction of the desk 1203. The processor 120 may receive sensing information from the wearable display device 201 and identify (or calculate) the distance or direction of the desk 1203 based on the sensing information. The processor 120 may determine the arrangement position of the identified object so that the identified object is arranged close to the desk 1203 based on the distance or direction of the desk 1203. The processor 120 may control displaying the identified object on the wearable display device 201 based on the arrangement position. The processor 120 may transmit arrangement information including the determined arrangement position and object information corresponding to the identified object to the wearable display device 201. The processor 120 may control displaying an object stored in the memory 130 and an object not stored in the memory 130 in a distinct manner.

Figure 12C:
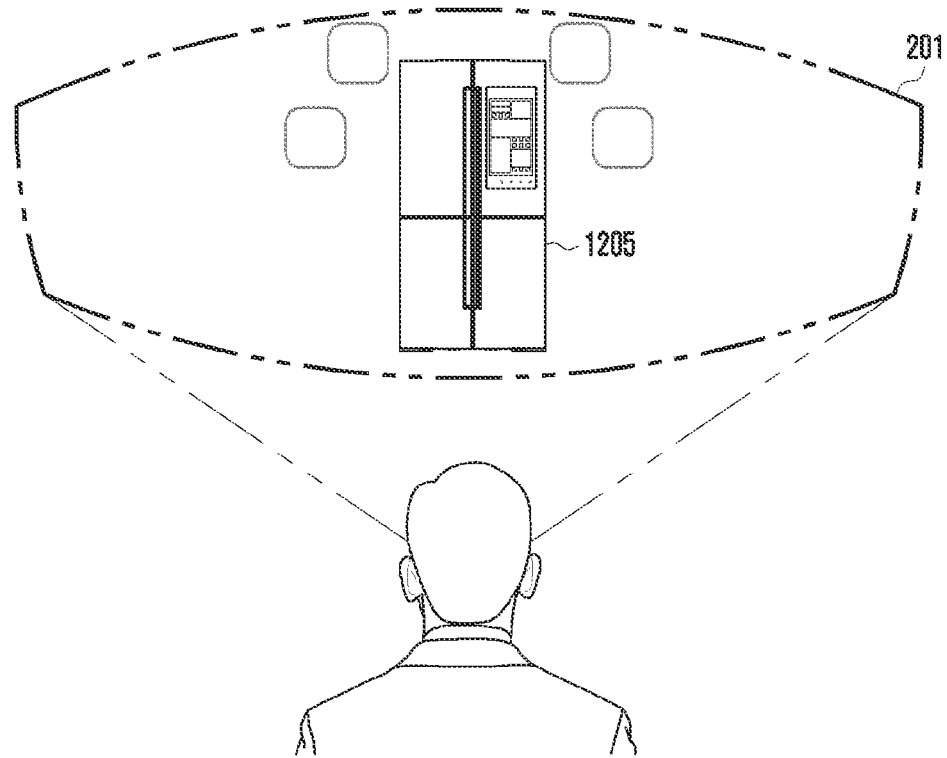

FIG. 12C is a diagram illustrating an example of recognizing a refrigerator and displaying a plurality of objects associated with the refrigerator on a wearable display device according to various embodiments.

Referring to FIG. 12C, the processor 120 may obtain an image from the wearable display device 201 in a state of being connected to the wearable display device 201. The processor 120 may analyze the image to recognize a refrigerator 1205 as the target object. When a user input for display on the wearable display device 201 is detected, the processor 120 may identify an object associated with the refrigerator 1205. The object may be an object associated with the refrigerator 1205, such as an application related to food, menu, or refrigerator malfunction diagnosis, among objects stored in the memory 130 (or installed in the electronic device 101). The processor 120 may identify, as an object, an application that is not installed in the electronic device 101 but can be installed in relation to the refrigerator 1205.

The processor 120 may identify the distance or direction of the refrigerator 1205 and may determine the arrangement position of the identified objects based on the distance or direction of the refrigerator 1205. The processor 120 may receive sensing information from the wearable display device 201 and identify (or calculate) the distance or direction of the refrigerator 1205 based on the sensing information. The processor 120 may determine the arrangement position of the identified object so that the identified object is arranged close to the refrigerator 1205 based on the distance or direction of the refrigerator 1205. The processor 120 may control displaying the identified object on the wearable display device 201 based on the arrangement position. The processor 120 may transmit arrangement information including the determined arrangement position and object information corresponding to the identified object to the wearable display device 201. The processor 120 may control displaying an object stored in the memory 130 and an object not stored in the memory 130 in a distinct manner.

Figure 12D:
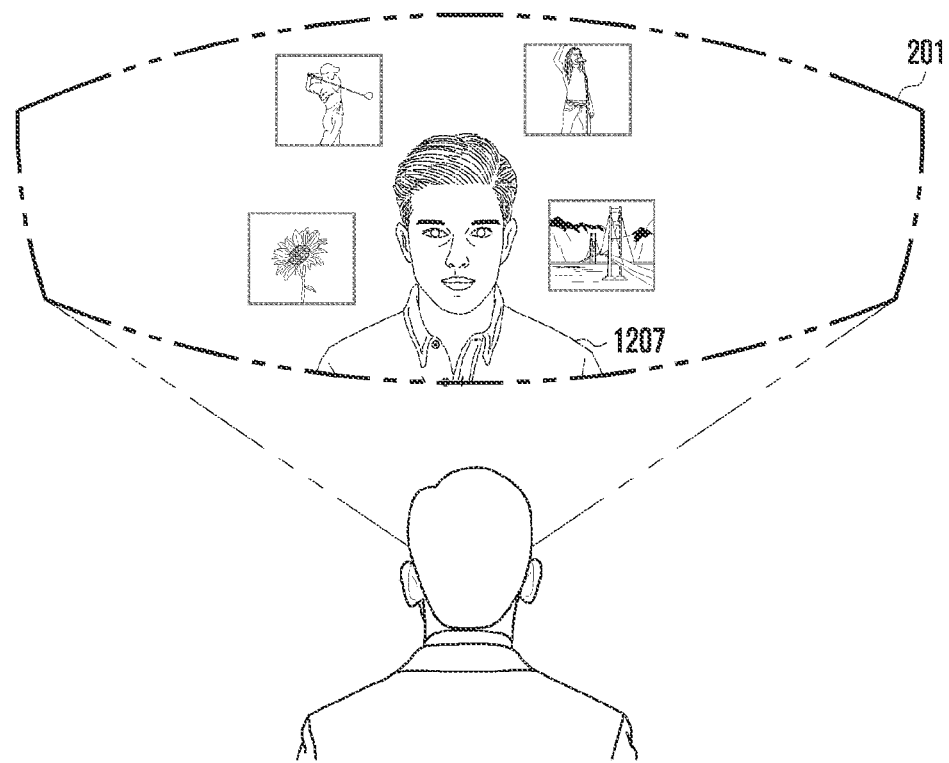

FIG. 12D is a diagram illustrating an example of recognizing a face and displaying a plurality of objects associated with the face on a wearable display device according to various embodiments.

Referring to FIG. 12D, the processor 120 may obtain an image from the wearable display device 201 in a state of being connected to the wearable display device 201. The processor 120 may analyze the image to recognize a human face 1207 as the target object. When a user input for display on the wearable display device 201 is detected, the processor 120 may identify an object associated with the recognized face 1207. The object may be an object associated with the face 1207, such as a photograph, contact, schedule, or an application related to a photograph, contact, or schedule, among objects stored in the memory 130.

The processor 120 may identify the distance or direction of the recognized face 1207 and may determine the arrangement position of the identified objects based on the distance or direction of the recognized face 1207. The processor 120 may receive sensing information from the wearable display device 201 and identify (or calculate) the distance or direction of the face 1207 based on the sensing information. The processor 120 may determine the arrangement position of the identified object so that the identified object is arranged close to the face 1207 based on the distance or direction of the face 1207. The processor 120 may control displaying the identified object on the wearable display device 201 based on the arrangement position. The processor 120 may transmit arrangement information including the determined arrangement position and object information corresponding to the identified object to the wearable display device 201.

According to various embodiments, when an object displayed on the wearable display device 201 is selected by the user, the processor 120 may transmit the object to a contact (e.g., phone number, email) corresponding to the recognized face 1207.

An operation method of an electronic device (e.g., electronic device 101 in FIG. 1) according to various embodiments may include: displaying a plurality of objects on a touch display (e.g., display module 160 in FIG. 1) of the electronic device; receiving a touch input for the plurality of objects through the touch display in a state of being connected to a wearable display device through a communication module (e.g., communication module 190 in FIG. 1) of the electronic device; identifying a direction corresponding to the touch input; identifying a display angle and a display distance of the wearable display device; determining an arrangement position of the plurality of objects included in the electronic device based on at least one of the identified direction, display angle, or display distance; and controlling displaying the plurality of objects on the wearable display device based on the determination result.

Receiving a touch input may include detecting, as a user interaction, at least one of a set touch input detected on the touch display, a motion change of the electronic device detected through a sensor module, or a motion change of a controller connected to the electronic device.

Determining an arrangement position may include determining the position at which the plurality of objects are to be arranged or the number of plurality of objects to be arranged, at the display distance based on the speed of the user interaction.

Determining an arrangement position may include identifying the attribute of an object included in the plurality of objects; and determining the arrangement position of a plurality of objects displayed on the electronic device based on at least one of the identified direction, display angle, display distance, or object attribute, wherein the object attribute may include at least one of time, history, file, or application.

Determining an arrangement position may include arranging the plurality of objects at positions in one direction within the display distance of the wearable display device according to the time attribute of the objects, arranging the plurality of objects at different positions in the depth direction of the display distance of the wearable display device according to the history attribute or file attribute of the objects, or arranging the plurality of objects at different positions in at least one of a horizontal direction, a vertical direction, or a depth direction on the display angle of the wearable display device according to the application attribute of the objects.

The method may further include obtaining an image captured by a camera of the wearable display device from the wearable display device; recognizing a target object by analyzing the obtained image; identifying an object associated with the target object based on the user interaction; identifying the distance or direction of the target object; and determining the arrangement position of the identified object based on the distance or direction of the target object.

Various embodiments of the disclosure described in the present specification and drawings are merely provided as specific examples for easily explaining the technical contents of the disclosure and helping understanding of the disclosure, and are not intended to limit the scope of the disclosure. Therefore, the scope of the disclosure should be construed to include all changes or modifications derived based on the subject matter of the disclosure in addition to the embodiments disclosed herein.

What is claimed is:

1. An electronic device comprising:
   a communication module;
   a touch display;
   a memory; and
   a processor operatively connected to the communication module and the memory,
   wherein the processor is configured to:
     obtain an image captured by a camera of a wearable display device from the wearable display device, while being connected to the wearable display device through the communication module,
     recognize a target object by analyzing the obtained image,
     detect a user interaction including touching the touch display and subsequently dragging downward and upward, the user interaction for displaying a plurality of objects associated with the target object on the wearable display device,
     identify, in response to detecting the user interaction, the plurality of objects associated with the target object,
     receive sensing information and location information from the wearable display device,
     calculate, based on the obtained image, the sensing information, and the location information, a distance between the wearable display device and the target object, a direction from the target object to the wearable display device, and an angle between the wearable display device and the target object,
     determine arrangement positions of the plurality of objects to be displayed on the wearable display device based on the calculated direction, the calculated angle, and the calculated distance, and
     control displaying of the plurality of objects on the wearable display device based on the determined arrangement positions of the plurality of objects,
   wherein when the target object is a desk, the processor is further configured to:
     identify, among the plurality of objects, a first application icon of a first document application and a second application icon of a second document application, and
     when a level of association between the desk and the first document application is higher than a level of association between the desk and the second document application, determine an arrangement position of the first application icon closer to the desk than an arrangement position of the second application icon.

2. The electronic device of claim 1, wherein the processor is configured to control arranging the plurality of objects in a space displayed on the wearable display device.

3. The electronic device of claim 1, wherein the processor is configured to determine the arrangement positions of the plurality of objects based on a speed of the user interaction.

4. The electronic device of claim 1, wherein the processor is further configured to determine a number of the plurality of objects based on a time of the user interaction.

5. The electronic device of claim 1, wherein the processor is configured to:
   identify an attribute of an object included in the plurality of objects, and
   determine the arrangement positions of the plurality of objects to be displayed on the wearable display device based further on the identified object attribute, and
   wherein the identified object attribute includes at least one of time, history, a file, or an application.

6. The electronic device of claim 5, wherein the determined arrangement positions of the plurality of objects includes positions in a direction within a display distance of the wearable display device according to time attributes of the plurality of objects.

7. The electronic device of claim 6, wherein the display distance includes a first display distance that is fixed with respect to a position of the electronic device, a second display distance that is fixed with respect to a user wearing the wearable display device, and a third display distance that is fixed with respect to an absolute position.

8. The electronic device of claim 5, wherein the determined arrangement positions of the plurality of objects includes:
   different arrangement positions of the plurality of objects in a depth direction of a display distance of the wearable display device according to history attributes or file attributes of the plurality of objects, or
   different arrangement positions of the plurality of objects in at least one of a horizontal direction, a vertical direction, or a depth direction on the display angle of the wearable display device according to application attributes of the plurality of objects.

9. The electronic device of claim 1, wherein the processor is further configured to:
   transmit arrangement information including the determined arrangement positions and object information corresponding to the plurality of objects to the wearable display device, and control the wearable display device to display the plurality of objects based on the arrangement information.

10. An operation method of an electronic device, the method comprising:
   obtaining an image captured by a camera of a wearable display device from the wearable display device, while being connected to the wearable display device through a communication module of the electronic device;
   recognizing a target object by analyzing the obtained image;
   detecting a user interaction including touching a touch display of the electronic device and subsequently dragging downward and upward, the user interaction for displaying a plurality of objects on the wearable display device;
   identifying, in response to detecting the user interaction, the plurality of objects associated with the target object;
   receiving sensing information and location information from the wearable display device;
   calculating, based on the obtained image, the sensing information, and the location information, a distance between the wearable display device and the target object, a direction from the target to the wearable display device, and an angle between the wearable display device and the target object;
   determining arrangement positions of the plurality of objects to be displayed on the wearable display device based on the calculated direction, the calculated angle, and the calculated distance; and
   controlling displaying of the plurality of objects on the wearable display device based on the determined arrangement positions of the plurality of objects,
   wherein when the target object is a desk, the processor is further configured to:
      identifying, among the plurality of objects, a first application icon of a first document application and a second application icon of a second document application, and
      when a level of association between the desk and the first document application is higher than a level of association between the desk and the second document application, determining an arrangement position of the first application icon closer to the desk than an arrangement position of the second application icon.

* * * * *